US012276927B2

(12) United States Patent
Kawamoto et al.

(10) Patent No.: US 12,276,927 B2
(45) Date of Patent: Apr. 15, 2025

(54) IMAGE FORMING APPARATUS AND IMAGE FORMING METHOD

(71) Applicant: FUJIFILM Business Innovation Corp., Tokyo (JP)

(72) Inventors: Yuka Kawamoto, Kanagawa (JP); Kenta Shingu, Kanagawa (JP); Yoshiteru Yamada, Kanagawa (JP); Daisuke Tano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/438,096

(22) Filed: Feb. 9, 2024

(65) Prior Publication Data

US 2025/0044725 A1 Feb. 6, 2025

(51) Int. Cl.
*G03G 15/16* (2006.01)

(52) U.S. Cl.
CPC ......... *G03G 15/161* (2013.01); *G03G 15/162* (2013.01); *G03G 2215/1661* (2013.01)

(58) Field of Classification Search
CPC ............... G03G 15/161; G03G 15/162; G03G 2215/1661
See application file for complete search history.

(56) References Cited

U.S. PATENT DOCUMENTS

| | | | | |
|---|---|---|---|---|
| 2014/0341629 A1* | 11/2014 | Watanabe | G03G 21/0017 399/350 |
| 2022/0373914 A1* | 11/2022 | Ikeda | G03G 9/09392 |

FOREIGN PATENT DOCUMENTS

| | | |
|---|---|---|
| JP | 2001-051565 A | 2/2001 |
| JP | 2009-300751 A | 12/2009 |
| JP | 2021-012342 A | 2/2021 |

* cited by examiner

*Primary Examiner* — Stephanie E Bloss
*Assistant Examiner* — Michael A Harrison
(74) *Attorney, Agent, or Firm* — Oliff PLC

(57) ABSTRACT

An image forming apparatus includes an image holder; a charging unit that charges a surface of the image holder; an electrostatic charge image forming unit that forms an electrostatic charge image on the charged surface of the image holder; a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower; an intermediate transfer belt that has an outer peripheral surface to which the toner image is to be transferred; a primary transfer unit that has a primary transfer member performing primary transfer of the toner image formed on the surface of the image holder to the outer peripheral surface of the intermediate transfer belt; a secondary transfer unit that has a secondary transfer member performing secondary transfer of the toner image transferred to the outer peripheral surface of the intermediate transfer belt by the primary transfer to a surface of a recording medium; and a cleaning device having a cleaning blade that is brought into contact with and cleans the outer peripheral surface of the intermediate transfer belt and that has a two-layer structure including an edge layer and a back surface layer, in which the edge layer and the back surface layer are constituted of a polyurethane resin, a ratio (Hb/Ha) of a hardness Hb of the edge layer to a hardness Ha of the back surface layer is 0.84 or more and 0.93 or less, and a total amount of F and Si present within 200 nm from the surface of the cleaning blade, which is brought into contact with the intermediate transfer belt of the edge layer, accounts for 75% or more of a total amount of F and Si present within 5 μm from the surface.

15 Claims, 2 Drawing Sheets

IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2023-128183 filed Aug. 4, 2023.

BACKGROUND

(i) Technical Field

The present disclosure relates to an image forming apparatus and an image forming method.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed. For the transfer of the toner image to a recording medium, for example, an intermediate transfer belt is used. In addition, for the cleaning of the outer peripheral surface of the intermediate transfer belt, a cleaning blade is used.

For example, in JP2009-300751A, "An image forming apparatus including an image carrier, a charging unit that charges the surface of the image carrier, a latent image forming unit that forms an electrostatic latent image on the surface of the charged image carrier, a developing unit that develops the electrostatic latent image formed on the surface of image carrier to form a toner image, a transfer unit that transfers the toner image on the surface of the image carrier to a transfer member, and a cleaning unit having a cleaning blade that abuts on the surface of the image carrier and cleans a transfer residual toner adhering to the surface of the image carrier, in which the cleaning blade includes a strip-shaped elastic body blade and a surface layer that covers a tip ridgeline portion of the elastic body blade, that is harder than the elastic body blade, and that has a friction coefficient of 0.1 or more and 0.6 or less, the image carrier has a surface protective layer in which fluororesin fine particles are dispersed, and the surface protective layer is formed by dispersing fluororesin fine particles having a volume-average particle size of 10 [μm] or less and then applying a coating liquid obtained by irradiating with ultrasonic wave." Is disclosed.

In JP2021-012342A, "A process cartridge including an image carrier, a developing unit that includes the toner and that develops an electrostatic latent image formed on the image carrier with the toner to form a visible image, and a cleaning unit that removes a residual toner remaining on the image carrier by a cleaning blade, in which the cleaning blade includes an elastic member that abuts on a surface of the image carrier and that removes the residual toner remaining on the image carrier, the elastic member has a base material and a surface layer provided on the base material, the surface layer is formed on at least a part of a lower surface of a base material including an abut portion in a case where a surface of the base material facing the downstream side in the traveling direction of the image carrier from the abut portion of the elastic member, which abuts on the image carrier, is defined as the lower surface of the base material, the surface layer has a hardness gradient at which the Martens hardness HM measured using a nanoindenter decreases in hardness from a surface toward the lower surface of the base material in the film thickness direction, as the Martens hardness HM, a measured value at a load of 1 μN and a measured value at a load of 1000 μN are 2.5 $N/mm^2$ or more and 32.5 $N/mm^2$ or less, an average film thickness of the surface layer in the abut portion is 10 m or more and 500 μm or less, and in the toner provided in the developing unit, a circularity is less than 0.950 and a fine powder content of 2 μm or less is 20% by number or more and 60% by number or less." Is disclosed.

In JP2001-051565A, "A cleaning blade formed by cutting a plate-shaped body made of a cured body of a polyurethane resin composition, in which an end surface of the cleaning blade formed by the cut is adhered with organic siloxane and subjected to oxygenation treatment and thus a silicon atom (Si) is present on the end surface in an amount of 4 atom % or more." is disclosed.

SUMMARY

An object of the present disclosure is to provide an image forming apparatus and an image forming method, in which the occurrence of toner filming on the surface of the intermediate transfer belt and the occurrence of the stapler mark in the image are suppressed, compared to an image forming apparatus and an image forming method, in which a cleaning blade where the ratio (Hb/Ha) of the hardness Hb (°) of the edge layer to the hardness Ha (°) of the back surface layer is less than 0.84 or more than 0.93, or a cleaning blade where the total amount of F and Si present within 200 nm from a surface of the edge layer, which is brought into contact with the intermediate transfer belt, is less than 75% with respect to the total amount of F and Si present within 5 μm from the surface is provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above object include the following aspect.

According to an aspect of the present disclosure, there is provided an image forming apparatus including,

- an image holder,
- a charging unit that charges a surface of the image holder,
- an electrostatic charge image forming unit that forms an electrostatic charge image on the charged surface of the image holder,
- a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of the release agent in the entire toner particles and a melting temperature of the release agent is 65° C. or higher and 80° C. or lower,
- an intermediate transfer belt that has an outer peripheral surface to which the toner image is to be transferred,
- a primary transfer unit that has a primary transfer member performing primary transfer of the toner image formed on the surface of the image holder to the outer peripheral surface of the intermediate transfer belt, a secondary transfer unit that has a secondary transfer member performing secondary transfer of the toner image transferred to the outer peripheral surface of the intermediate transfer belt by the primary transfer to a surface of a recording medium, and a cleaning device having a cleaning blade that is brought into contact with and cleans the outer peripheral surface of the intermediate transfer belt and that has a two-layer structure consisting of an edge layer and a back surface layer, in which the edge layer and the back surface layer are constituted of a polyurethane resin, a ratio (Hb/Ha) of a hardness Hb of the edge layer to a hardness Ha of the back surface layer is 0.84 or more and 0.93 or less, and a total amount of F and Si present within 200 nm from a surface of the cleaning blade, which is brought into contact with the intermediate transfer belt of the edge layer, accounts for 75% or more of a total amount of F and Si present within 5 m from the surface.

BRIEF DESCRIPTION OF THE DRAWINGS

Exemplary embodiment(s) of the present invention will be described in detail based on the following figures, wherein.

DETAILED DESCRIPTION

Figure 1:
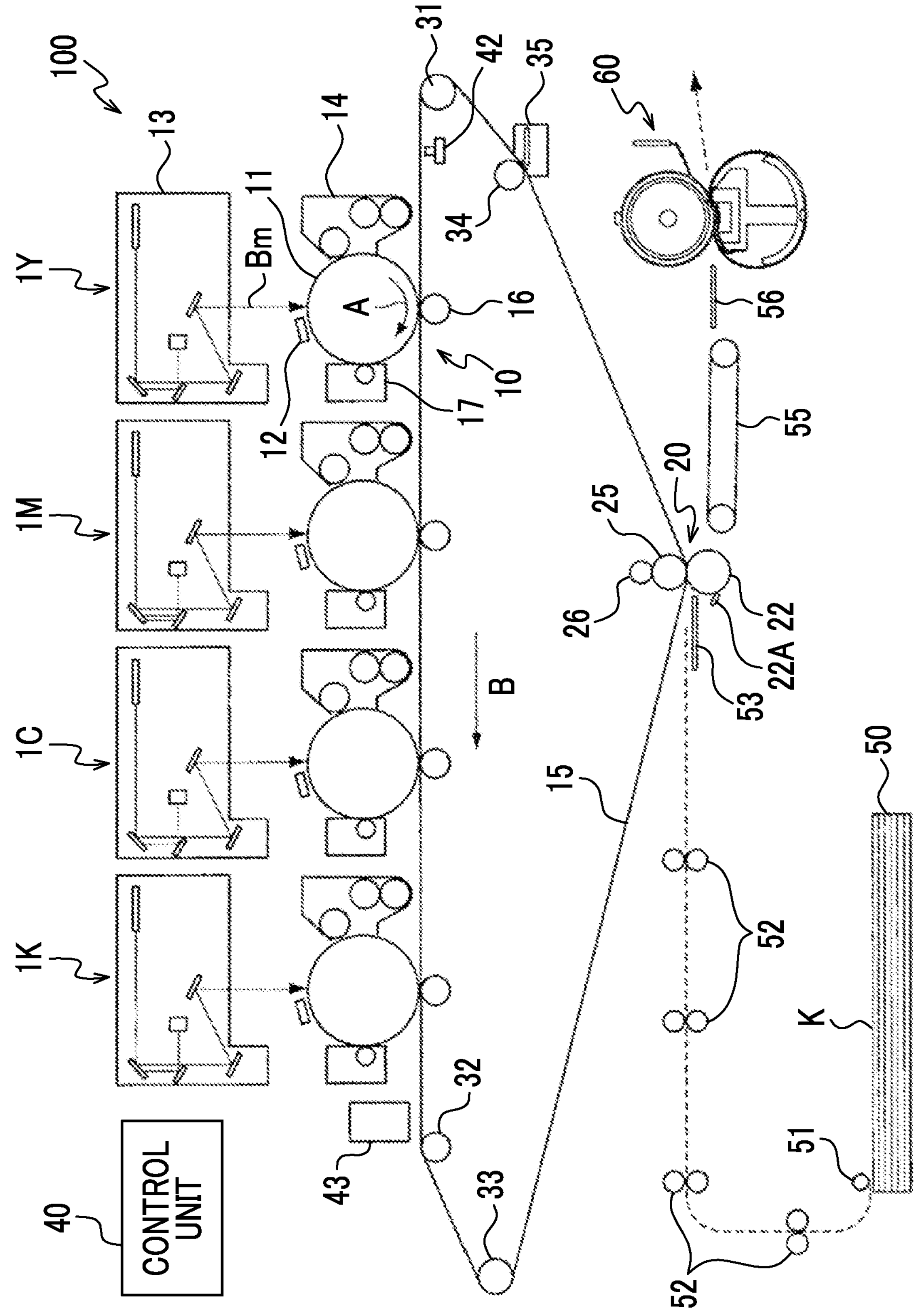
FIG. 1 is a schematic configuration view showing an example of an image forming apparatus according to the present exemplary embodiment.

Hereinafter, the present exemplary embodiment as an example of the present disclosure will be described. The description and examples of these exemplary embodiments illustrate the exemplary embodiments and do not limit the scopes of the exemplary embodiments.

Regarding the ranges of numerical values described in stages in the present exemplary embodiment, the upper limit value or lower limit value of a range of numerical values may be replaced with the upper limit or lower limit of another range of numerical values described in stages. In addition, regarding the ranges of numerical values described in the present exemplary embodiment, the upper limit value or lower limit value of a range of numerical values may be replaced with values described in examples.

In the present exemplary embodiment, the term “step” includes not only an independent step but also a step that cannot be clearly distinguished from other steps but can achieve the expected object thereof.

In the present exemplary embodiment, in a case where an exemplary embodiment is described with reference to drawings, the configuration of the exemplary embodiment is not limited to the configuration shown in the drawings. In addition, the sizes of members in each drawing are conceptual, and a relative relationship between the sizes of the members is not limited thereto.

In the present exemplary embodiment, each component may include two or more kinds of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Image Forming Apparatus

The image forming apparatus according to the present exemplary embodiment includes an image holder, a charging unit that charges the surface of the image holder, an electrostatic charge image forming unit that forms an electrostatic charge image on the charged surface of the image holder, a developing unit that accommodates an electrostatic charge image developer containing a toner having toner particles and that develops the electrostatic charge image formed on the surface of the image holder as a toner image by the electrostatic charge image developer, an intermediate transfer belt that has an outer peripheral surface to which the toner image is to be transferred, a primary transfer unit that has a primary transfer member performing primary transfer of the toner image formed on the surface of the image holder to the outer peripheral surface of the intermediate transfer belt, a secondary transfer unit that has a secondary transfer member performing secondary transfer of the toner image transferred to the outer peripheral surface of the intermediate transfer belt by the primary transfer to a surface of a recording medium, and a cleaning device having a cleaning blade which is brought into contact with and cleans an outer peripheral surface of the intermediate transfer belt.

In the toner particles, the release agent present in a region within 800 nm from a surface of the toner particles is 70% or more of the release agent in the entire toner particles and a melting temperature of the release agent is 65° C. or higher and 80° C. or lower.

The cleaning blade has a two-layer structure consisting of an edge layer and a back surface layer, and the edge layer and the back surface layer are constituted of a polyurethane resin. The ratio (Hb/Ha) of the hardness Hb (°) of the edge layer to the hardness Ha (°) of the back surface layer is 0.84 or more and 0.93 or less. Furthermore, the total amount of F and Si present within 200 nm from the surface of the edge layer, which is brought into contact with the intermediate transfer belt accounts for 75% or more of the total amount of F and Si present within 5 m from the surface.

With the above configuration, in the image forming apparatus according to the present exemplary embodiment, the occurrence of toner filming on the surface of the intermediate transfer belt and the occurrence of a stapler mark in an image are suppressed. The reason is presumed as follows.

From the viewpoint of improving the low-temperature fixability of an image, it has been studied to use a toner having toner particles in which wax having a low melting temperature is unevenly distributed on a surface layer, specifically, a toner in which a release agent present in a region within 800 nm from a surface of the toner particles is 70% or more of the release agent in the entire toner particles and a melting temperature of the release agent is 65° C. or higher and 80° C. or lower. However, in a case where toner particles in which wax having a low melting temperature is unevenly distributed on the surface layer is used, toner filming may easily occur on the surface of the intermediate transfer belt during repeatedly forming the image having a low image density in a high temperature and high humidity environment. This is considered to be because the toner particles in which the wax having a low melting temperature as described above has been unevenly distributed on the surface layer are soft in the high temperature and high humidity environment and are easily crushed. Furthermore, this is considered to be because the pressure applied from the cleaning blade to one toner particle is increased by reducing the number of toner particles present on the intermediate transfer belt by repeatedly forming an image having a low image density.

On the other hand, a method of suppressing the occurrence of toner filming by adjusting the cleaning blade pressed against the intermediate transfer belt can be considered. Examples thereof include a method of suppressing the toner filming by increasing in hardness of the cleaning blade to improve the scraping property. However, in a case where the hardness of the cleaning blade is increased to improve the scraping property, the followability of the cleaning blade to the facing surface is deteriorated, and a stapler mark may be generated in an image formed as a result. The stapler mark refers to image defects where two points having a high density appear side by side on the image in a direction (width direction) orthogonal to the process direction (that is, equal to the running direction of the intermediate transfer belt and equal to the transporting direction of the recording medium).

On the other hand, in the image forming apparatus according to the present exemplary embodiment, the cleaning blade in which the total amount of F and Si present within 200 nm from the surface which is brought into contact with the intermediate transfer belt of the edge layer accounts for 75% or more of the total amount of F and Si present within 5 m from the surface is used. That is, F and Si are unevenly distributed in the vicinity of the contact portion with the intermediate transfer belt in the cleaning blade. In a case where at least one of F or Si is present in the contact portion, the friction of the cleaning blade is reduced, and the behavior of the cleaning blade is stabilized at the tip of the contact portion. Accordingly, even in a case where toner particles in which wax having a low melting temperature is unevenly distributed on the surface layer as distributed above is used, the occurrence of toner filming on the surface of the intermediate transfer belt during repeatedly forming the image having a low image density in a high temperature and high humidity environment is suppressed.

In addition, in the image forming apparatus according to the present exemplary embodiment, a cleaning blade having a two-layer structure consisting of an edge layer and a back surface layer, in which the ratio (Hb/Ha) of the hardness Hb (°) of the edge layer to the hardness Ha (°) of the back surface layer is 0.84 or more and 0.93 or less is used. That is, a cleaning blade having a two-layer structure in which the hardness of the back surface layer is higher than the hardness of the edge layer is used, and therefore the followability of the cleaning blade to the facing surface is enhanced. As a result, the occurrence of the stapler mark in the formed image is suppressed.

From the above, it is presumed that the image forming apparatus according to the present exemplary embodiment suppresses the occurrence of toner filming on the surface of the intermediate transfer belt and the occurrence of a stapler mark in the image.

Toner

The toner contained in the electrostatic charge image developer used in the image forming apparatus according to the present exemplary embodiment will be described. The toner contains toner particles, and in the toner particles, the release agent present in a region within 800 nm from a surface of the toner particles is 70% or more of the release agent in the entire toner particles and a melting temperature of the release agent is 65° C. or higher and 80° C. or lower.

The toner particles contain a release agent and may further contain a binder resin. In addition, the toner particles may contain other internal additives such as a colorant.

Release Agent

The melting temperature of the release agent is 65° C. or higher and 80° C. or lower, for example, preferably 68° C. or higher and 77° C. or lower, more preferably 70° C. or higher and 75° C. or lower. In a case where the melting temperature of the release agent is 80° C. or lower, the low-temperature fixability of the image can be improved. On the other hand, in a case where the melting temperature of the release agent is 65° C. or higher, the occurrence of toner filming on the surface of the transfer belt is suppressed.

The melting temperature of the release agent is determined from a DSC curve obtained by differential scanning calorimetry (DSC) by "peak melting temperature" described in the method for determining the melting temperature in JIS K-7121-1987, "Testing methods for transition temperatures of plastics".

As for the release agent, 70% or more of the all release agents is present within 800 nm from the surface of the toner particles (hereinafter, the abundance ratio of the release agent present within 800 nm from the surface of the toner particles is referred to as "surface layer ratio of release agent").

The surface layer ratio of the release agent is 70% or more, for example, preferably 75% or more, and more preferably 80% or more. The upper limit value of the surface layer ratio of the release agent is, for example, preferably 100%. In a case where the surface layer ratio of the release agent is 70% or more, the low-temperature fixability of the image can be improved.

Here, a method of measuring the surface layer ratio of the release agent will be described.

Samples and images for measurement are prepared by the following methods.

The toner is mixed with and embedded in an epoxy resin, and the epoxy resin is solidified. The obtained solidified substance is cut with an ultramicrotome device (UltracutUCT manufactured by Leica Microsystems), thereby producing a thin sample having a thickness of 80 nm or more and 130 nm or less. By using an ultra-high resolution field emission scanning electron microscope (FE-SEM, S-4800 manufactured by Hitachi High-Tech Corporation.), an SEM image of the thin sample is obtained. In the SEM image, a toner particle cross section in which the maximum length of 85% or more of the volume-average particle size of the toner particles is selected, the domain of the release agent is observed, the area of the release agent of the entire toner particles and the area of the release agent present in the region within 800 nm from the surface of the toner particles are determined, and the ratio of the two areas (the area of the release agent present in the region within 800 nm from the surface of the toner particles/the area of the release agent of the entire toner particles) is calculated. Then, this calculation is performed for 100 toner particles, and an average value thereof is defined as the surface layer ratio of the release agent.

The reason for selecting toner particle cross sections in which the maximum length is 85% or more of the volume-average particle size of the toner particles is that cross sections in which the maximum length is less than 85% of the volume-average particle size are expected to be cross sections of the end portions of the toner particles, and thus the state of the domain in the toner particles is not sufficiently reflected on the cross section of the end portions of the toner particles.

Examples of the control method for setting the surface layer ratio of the release agent to 70% or more include a method in which toner particles have a core/shell structure and a release agent is used when forming a shell.

Examples of the release agent include hydrocarbon-based wax such as paraffin wax; natural wax such as carnauba wax, rice wax, and candelilla wax; synthetic or mineral/petroleum-based wax such as montan wax; ester-based wax such as fatty acid esters and montanic acid esters; and the like. The release agent is not limited to the agents.

As the release agent, for example, a hydrocarbon-based wax is preferably used. The hydrocarbon-based wax is a wax having a hydrocarbon as a skeleton, and examples thereof include Fischer-Tropsch wax, a polyethylene-based wax (a wax having a polyethylene skeleton), a polypropylene-based wax (a wax having a polypropylene skeleton), a paraffin-based wax (a wax having a paraffin skeleton), a microcrystalline wax, and the like. Among these, from the viewpoint of fixability, for example, the hydrocarbon-based wax may be Fischer-Tropsch wax, a polyethylene wax, or polypropylene wax. In addition, from the viewpoint of fixability, for example, a plurality of types of hydrocarbon-based waxes are preferably contained in the toner particles.

The ratio of the hydrocarbon-based wax to the all release agents may be, for example, 85% by mass or more, and is preferably 95% by mass or more and more preferably 100% by mass.

The content of the release agent is, for example, preferably 1% by mass or more and 20% by mass or less, more preferably 3% by mass or more and 20% by mass or less, even more preferably 3% by mass or more and 15% by mass or less, and even still more preferably 5% by mass or more and 15% by mass or less with respect to the entire toner particles.

Binder Resin

As the binder resin, for example, a polyester resin is preferably used. The ratio of the polyester resin to the all binder resins may be, for example, 75% by mass or more, and is preferably 90% by mass or more and more preferably 100% by mass.

Examples of the polyester resin include known amorphous polyester resins. As the polyester resin, a crystalline polyester resin may be used in combination with an amorphous polyester resin. Provided that the content of the crystalline polyester resin may be, for example, in a range of 2% by mass or more and 40% by mass or less (for example, preferably 2% by mass or more and 20% by mass or less) with respect to the all binder resins.

The "crystallinity" of a resin indicates that a clear endothermic peak is present in differential scanning calorimetry (DSC) rather than a stepwise change in endothermic amount and specifically indicates that the half-width of the endothermic peak in a case of measurement at a temperature rising rate of 10 (° C./min) is within 10° C.

On the other hand, the "amorphous" resin indicates that the half-width is more than 10° C., a stepwise change in endothermic amount is shown, or a clear endothermic peak is not recognized.

Amorphous Polyester Resin

Examples of the amorphous polyester resin include a polycondensate of a polyvalent carboxylic acid and a polyhydric alcohol. As the amorphous polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters of these (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, an anhydride of these, a lower alkyl ester of these (for example, having 1 or more and 5 or less carbon atoms) thereof.

One kind of polyvalent carboxylic acid may be used alone, or two or more kinds of polyvalent carboxylic acids may be used in combination.

Examples of the polyhydric alcohol include an aliphatic diol (for example, ethylene glycol, diethylene glycol, triethylene glycol, propylene glycol, butanediol, hexanediol, or neopentyl glycol), an alicyclic diol (for example, cyclohexanediol, cyclohexanedimethanol, or hydrogenated bisphenol A), and an aromatic diol (for example, an ethylene oxide adduct of bisphenol A or a propylene oxide adduct of bisphenol A). Among these, as the polyhydric alcohol, for example, an aromatic diol or an alicyclic diol is preferable, and an aromatic diol is more preferable.

As the polyhydric alcohol, a polyhydric alcohol having a valency of 3 or more that has a crosslinked structure or a branched structure may be used in combination with a diol. Examples of the polyhydric alcohol having a valency of 3 or more include glycerin, trimethylolpropane, and pentaerythritol.

The polyhydric alcohol may be used alone or in combination of two or more kinds.

The glass transition temperature (Tg) of the amorphous polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC HLC-8120GPC manufactured by Tosoh Corporation as a measurement device, TSKgel Super HM-M (15 cm) manufactured by Tosoh Corporation as a column, and THE as a solvent. The weight-average molecular weight and the number-average molecular weight are calculated using a molecular weight calibration curve plotted using a monodisperse polystyrene standard sample from the measurement results.

The amorphous polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the copolymerization reaction, for example, the monomer with poor compatibility may be condensed in advance with an acid or an alcohol that is to be polycondensed with the monomer, and then polycondensed with the major component.

Crystalline Polyester Resin

Examples of the crystalline polyester resin include a polycondensate of polyvalent carboxylic acid and polyhydric alcohol. As the crystalline polyester resin, a commercially available product or a synthetic resin may be used.

Here, since the crystalline polyester resin easily forms a crystal structure, the crystalline polyester resin is, for example, preferably a polycondensate that is not formed of an aromatic-containing polymerizable monomer but is formed of a linear aliphatic polymerizable monomer.

Examples of the polyvalent carboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides of these dicarboxylic acids, and lower alkyl esters (for example, having 1 or more and 5 or less carbon atoms) of these dicarboxylic acids.

As the polyvalent carboxylic acid, a carboxylic acid having a valency of 3 or more that has a crosslinked structure or a branched structure may be used in combination with a dicarboxylic acid. Examples of the trivalent carboxylic acids include aromatic carboxylic acid (for example, 1,2,3-benzenetricarboxylic acid, 1,2,4-benzenetricarboxylic acid, 1,2,4-naphthalenetricarboxylic acid, and the like), anhydrides of these aromatic carboxylic acids, and lower alkyl esters (for example, having 1 or more and 5 or less carbon atoms) of these aromatic carboxylic acids.

As the polyvalent carboxylic acid, a dicarboxylic acid having a sulfonic acid group or a dicarboxylic acid having an ethylenically double bond may be used together with these dicarboxylic acids.

One kind of polyvalent carboxylic acid may be used alone, or two or more kinds of polyvalent carboxylic acids may be used in combination.

Examples of the polyhydric alcohol include an aliphatic diol (for example, a linear aliphatic diol having 7 or more and 20 or less carbon atoms in a main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the aliphatic diols, for example, 1,8-octanediol, 1,9-nonanediol, or 1,10-decanediol is preferable.

As the polyhydric alcohol, an alcohol having a valency of 3 or more that has a crosslinked structure or a branched structure, may be used in combination with the diol. Examples of the alcohol having a valency of 3 or more include glycerin, trimethylolethane, and trimethylolpropane, pentaerythritol.

The polyhydric alcohol may be used alone or in combination of two or more kinds.

Here, the content of the aliphatic diol in the polyhydric alcohol may be 80% by mole or more and, for example, preferably 90% by mole or more.

The melting temperature of the crystalline polyester resin is, for example, preferably 50° C. or higher and 100° C. or lower, more preferably 55° C. or higher and 90° C. or lower, and even more preferably 60° C. or higher and 85° C. or lower.

The melting temperature is determined from a DSC curve obtained by differential scanning calorimetry (DSC) by "peak melting temperature" described in the method for determining the melting temperature in JIS K7121-1987, "Testing methods for transition temperatures of plastics".

The weight-average molecular weight (Mw) of the crystalline polyester resin is, for example, preferably 6,000 or more and 35,000 or less.

The crystalline polyester resin can be obtained by a well-known manufacturing method, for example, same as the amorphous polyester resin.

Here, as the binder resin, other binder resins may be used in combination with the polyester resin. As the other binder resins, for example, a styrene (meth) acrylic resin is preferable.

Styrene (Meth)acrylic Resin

The styrene (meth)acrylic resin is a copolymer obtained by at least copolymerizing a monomer having a styrene skeleton and a monomer having a (meth)acryloyl group.

Furthermore, "(meth)acrylic acid" is an expression including both of "acrylic acid" and "methacrylic acid". In addition, the "(meth)acryloyl group" is an expression including both the "acryloyl group" and the "methacryloyl group".

Examples of the monomer (hereinafter, referred to as "styrene-based monomer") having a styrene skeleton include styrene, alkyl-substituted styrene (such as a-methylstyrene, 2-methylstyrene, 3-methylstyrene, 4-methylstyrene, 2-ethylstyrene, 3-ethylstyrene, or 4-ethylstyrene), halogen-substituted styrene (such as 2-chlorostyrene, 3-chlorostyrene, or 4-chlorostyrene), and vinylnaphthalene. The styrene-based monomer may be used alone or in combination of two or more kinds thereof.

Among these, from the viewpoints of reaction, ease of control of reaction, and availability, as the styrene-based monomer, for example, styrene is preferable.

Examples of the monomer having a (meth)acryloyl group (hereinafter, referred to as "(meth)acrylic monomer")

include (meth)acrylic acid and (meth)acrylic acid ester. Examples of the (meth)acrylic acid ester include (meth) acrylic acid alkyl ester (such as n-methyl (meth)acrylate, n-ethyl (meth)acrylate, n-propyl (meth)acrylate, n-butyl (meth)acrylate, n-pentyl (meth)acrylate, n-hexyl (meth) acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth) acrylate, isooctyl (meth)acrylate, 2-ethylhexyl (meth) acrylate, cyclohexyl (meth)acrylate, or t-butylcyclohexyl (meth)acrylate), (meth)acrylic acid aryl ester (such as phenyl (meth)acrylate, biphenyl (meth)acrylate, diphenylethyl (meth)acrylate, t-butylphenyl (meth)acrylate, or terphenyl (meth)acrylate), dimethylaminoethyl (meth)acrylate, diethylaminoethyl (meth)acrylate, methoxyethyl (meth)acrylate, 2-hydroxyethyl (meth)acrylate, P-carboxyethyl (meth)acrylate, and (meth)acrylamide. The (meth)acrylic acid-based monomer may be used alone or in combination of two or more kinds thereof.

The copolymerization ratio of the styrene-based monomer to the (meth)acrylic monomer (on a mass basis, styrene-based monomer/(meth)acrylic monomer) may be, for example, 85/15 to 70/30.

The styrene (meth)acrylic resin may have, for example, a crosslinked structure from the viewpoint of suppressing offset of an image. Examples of the styrene (meth)acrylic resin having a crosslinked structure include a crosslinked product crosslinked by at least copolymerizing a monomer having a styrene skeleton, a monomer having a (meth) acrylic acid skeleton, and a crosslinkable monomer.

Examples of the crosslinkable monomer include bifunctional or higher functional crosslinking agents.

Examples of the bifunctional crosslinking agent include divinylbenzene, divinylnaphthalene, a di(meth)acrylate compound (such as diethylene glycol di(meth)acrylate, methylenebis(meth)acrylamide, decanediol diacrylate, and glycidyl (meth)acrylate), polyester-type di(meth)acrylate, and 2-([1'-methylpropylideneamino]carboxyamino)ethyl methacrylate.

Examples of the polyfunctional crosslinking agent include a tri(meth)acrylate compound (such as pentaerythritol tri(meth)acrylate, trimethylolethane tri(meth)acrylate, or trimethylolpropane tri(meth)acrylate), a tetra(meth)acrylate compound (such as tetramethylolmethane tetra(meth) acrylate or oligoester (meth)acrylate), 2,2-bis(4-methacryloxy polyethoxyphenyl)propane, diallyl phthalate, triallyl cyanurate, triallylisocyanurate, triallyl isocyanurate, triallyl trimellitate, and diallyl chlorendate.

The copolymerization ratio of the crosslinkable monomer to the total monomers (on a mass basis, crosslinkable monomer/total monomers) may be, for example, 2/1,000 to 30/1,000.

From the viewpoint of suppressing offset of an image, the weight-average molecular weight (Mw) of the styrene (meth)acrylic resin may be, for example, 30,000 or more and 200,000 or less, and is preferably 40,000 or more and 100,000 or less and more preferably 50,000 or more and 80,000 or less.

The weight-average molecular weight of the styrene (meth)acrylic resin is a value measured by the same method as the weight-average molecular weight of the polyester resin.

From the viewpoints of achieving both the fluidity and storage property of the toner and the suppression of offset of an image, the content of the styrene (meth)acrylic resin may be, for example, 10% by mass or more and 30% by mass or less, and is preferably 12% by mass or more and 28% by mass or less and more preferably 15% by mass or more and 25% by mass or less with respect to the toner particles.

Furthermore, other binder resins may be used in combination as the binder resin.

Examples of the other binder resins include vinyl-based resins consisting of a homopolymer of a monomer, such as styrenes (for example, styrene, p-chlorostyrene, a-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the other binder resins include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these other binder resins may be used alone, or two or more kinds of these binder resins may be used in combination.

The content of the binder resin is, for example, preferably 40% by mass or more and 95% by mass or less, more preferably 50% by mass or more and 90% by mass or less, and even more preferably 60% by mass or more and 85% by mass or less with respect to the entire toner particles.

Colorant

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the entire toner particles is, for example, preferably 1% by mass or more and 30% by mass or less, and more preferably 3% by mass or more and 15% by mass or less.

Other Additives

Examples of the other additives in the toner include well-known additives such as a magnetic material, a charge control agent, and inorganic powder. The additives are incorporated into the toner particles as internal additives.

Characteristics of Toner Particles

The toner particles may be toner particles that have a single-layer structure or toner particles having a so-called core/shell structure that is configured with a core portion (core particle) and a coating layer (shell layer) covering the core portion, and for example, is preferably the core/shell structure. The toner particles having a core/shell structure are, for example, preferably configured with a core portion that is configured with a binder resin and a colorant, and a coating layer that is configured with a binder resin and a release agent.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The solution is added to 100 ml or more and 150 ml or less of the electrolytic solution.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are drawn from small-sized particles. The particle size at which the cumulative proportion of particles is 16% is defined as a volume-based particle size D16v and a number-based particle size D16p. The particle size at which the cumulative proportion of particles is 50% is defined as a volume-average particle size D50v and a number-average particle size D50p. The particle size at which the cumulative proportion of particles is 84% is defined as a volume-based particle size D84v and a number-based particle size D84p.

By using these, a volume-average particle size distribution index (GSDv) is calculated as $(D84v/D16v)^{1/2}$ and a number-average particle size distribution index (GSDp) is calculated as $(D84p/D16p)^{1/2}$.

The shape factor SF1 of the toner particles is, for example, preferably 110 or more and 150 or less and more preferably 120 or more and 140 or less.

The shape factor SF1 is obtained by the following equation.

$$\text{Equation: } SF1 = (ML^2/A) \times (\pi/4) \times 100$$

In the above equation, ML represents the absolute maximum length of the toner, and A represents the projected area of the toner.

Specifically, the shape factor SF1 is quantified generally by analyzing a microscopic image or a scanning electron microscopic image using an image analyzer, and is calculated as follows. That is, the shape factor SF1 is obtained by capturing an optical microscopic image of particles scattered on the surface of the slide glass into a LUZEX image analyzer with a video camera, obtaining the maximum length and the projected area of 100 particles, and calculating with the above equation to obtain the average value thereof.

External Additive

The toner may further contain an external additive in addition to the toner particles.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O\ (TiO_2)_n$, $Al_2O_3.2SiO_2$, $CaCO_3$, $MgCO_3$, $BaSO_4$, and $MgSO_4$.

The surface of the inorganic particles serving as the external additive may be subjected to, for example, a hydrophobic treatment. The hydrophobic treatment is performed, for example, by dipping the inorganic particles in a hydrophobic treatment agent. The hydrophobic treatment agent is not particularly limited, and examples thereof include a silane-based coupling agent, silicone oil, a titanate-based coupling agent, an aluminum-based coupling agent, and the like. Such hydrophobic treatment agent may be used alone or in combination of two or more kinds thereof.

The amount of the hydrophobic treatment agent is, for example, 1 part by mass or more and 10 parts by mass or less with respect to 100 parts by mass of the inorganic particles.

Examples of the external additive also include resin particles (resin particles of polystyrene, polymethylmethacrylate (PMMA), a melamine resin, or the like), a cleaning activator (for example, and a metal salt of a higher fatty acid represented by zinc stearate or fluorine-based polymer particles), and the like.

The amount of the external additive externally added is, for example, preferably 0.01% by mass or more and 5% by mass or less, and more preferably 0.01% by mass or more and 2.0% by mass or less with respect to the toner particles.

Manufacturing Method of Toner

The toner used in the image forming apparatus according to the present exemplary embodiment manufactures toner particles, and in a case where the toner particles further contain an external additive, the toner particles are manufactured by externally adding an external additive.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and well-known manufacturing methods are adopted. Among the above methods, for example, the toner particles are preferably obtained by the aggregation and coalescence method.

Hereinafter, details of each step of the aggregation and coalescence method will be described. In the following section, a method for obtaining toner particles containing a colorant will be described. The colorant is used as necessary. Naturally, other additives different from the colorant may also be used.

Resin Particle Dispersion Preparing Step

First, a resin particle dispersion in which polyester resin particles to be a binder resin are dispersed, a colorant dispersion in which colorant particles are dispersed, and a release agent particle dispersion in which release agent particles are dispersed are prepared.

The polyester resin particle dispersion is prepared, for example, by dispersing the polyester resin particles in a dispersion medium by using a surfactant.

Examples of the dispersion medium used for the polyester resin particle dispersion include an aqueous medium.

Examples of the aqueous medium include distilled water, water such as deionized water, alcohols, and the like. Each of these media may be used alone, or two or more of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant.

One surfactant may be used alone, or two or more surfactants may be used in combination.

Examples of the method for dispersing the polyester resin particles in the dispersion medium include general dispersion methods such as a rotary shearing homogenizer, a ball mill having media, a sand mill, and a dyno mill. Alternatively, the polyester resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding water (W phase), such that the resin undergoes phase transition from W/O to O/W and is dispersed in the aqueous medium in the form of particles.

The volume-average particle size of the polyester resin particles dispersed in the polyester resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the polyester resin particles, a particle size distribution is measured using a laser diffraction-type particle size distribution analyzer (for example, LA-700 manufactured by HORIBA, Ltd.), a cumulative volume distribution from small-sized particles is drawn for the particle size range (channel) divided using the obtained particle size distribution, and the particle size at which the cumulative proportion of particles is 50% of all particles is defined as a volume-average particle size D50v. For particles in other dispersions, the volume-average particle size is measured in the same manner.

The content of the polyester resin particles contained in the polyester resin particle dispersion is, for example, preferably 5% by mass or more and 50% by mass or less and more preferably 10% by mass or more and 40% by mass or less.

A colorant dispersion and a release agent particle dispersion are prepared in the same manner as in the polyester resin particle dispersion. That is, the dispersion medium, the dispersion method, the volume-average particle size of the particles, and the content of the particles in the polyester resin particle dispersion are the same for the colorant dispersion and the release agent particle dispersion.

First Aggregated Particle-Forming Step

Next, the polyester resin particle dispersion is mixed with the colorant dispersion.

Then, in the mixed dispersion, the polyester resin particles and the colorant particles are hetero-aggregated to form first aggregated particles which have a diameter close to the diameter of the target toner particles and include the polyester resin particles and the colorant particles.

A release agent particle dispersion may also be mixed as necessary, and the release agent particles may be contained in the first aggregated particles.

Specifically, for example, the first aggregated particles are formed by adding an aggregating agent to the mixed dispersion, adjusting the pH of the mixed dispersion to be acidic (for example, a pH of 2 or more and 5 or less), adding a dispersion stabilizer thereto as necessary, heating the mixture to a temperature close to the glass transition temperature of the polyester resin (specifically, for example, a temperature higher than or equal to the glass transition temperature of the polyester resin −30° C. and lower than or equal to the glass transition temperature thereof −10° C.), and allowing the particles to be dispersed in the mixed dispersion to be aggregated.

In the first aggregated particle-forming step, for example, the heating may be performed after the mixed dispersion is stirred with a rotary shearing homogenizer, the aggregating agent is added thereto at room temperature (for example, 25° C.), the pH of the mixed dispersion is adjusted to be acidic (for example, a pH of 2 or more and 5 or less), and the dispersion stabilizer is added thereto as necessary.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the aggregating agent used is reduced, and the charging characteristics are improved.

In addition to the aggregating agent, an additive that forms a complex or a bond similar to the complex with a metal ion of the aggregating agent may be used. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Second Aggregated Particle-Forming Step

The first aggregated particle dispersion in which the first aggregated particles are dispersed is obtained, and the first aggregated particle dispersion are then mixed with the polyester resin particle dispersion and the release agent particle dispersion. The polyester resin particle dispersion may be mixed with the release agent particle dispersion in advance, and this mixed liquid may be mixed with the first aggregated particle dispersion.

Then, in the mixed dispersion in which the first aggregated particles, the polyester resin particles, and the release agent particles are dispersed, the polyester resin particles and the release agent particles are aggregated to be adhered to the surface of the first aggregated particles, thereby forming second aggregated particles.

Specifically, for example, in the first aggregated particle-forming step, in a case where the first aggregated particles reach a target particle size, a dispersion in which the polyester resin particles and the release agent particles are dispersed is mixed with the first aggregated particle dispersion. Next, the mixed dispersion is heated at a temperature equal to or lower than the glass transition temperature of the polyester resin, the pH of the mixed dispersion is adjusted to, for example, a range of about 6.5 or more and 8.5 or less, and the progress of aggregation is stopped.

Accordingly, the second aggregated particles aggregated such that the polyester resin particles and the release agent particles adhere to the surface of the first aggregated particles are obtained.

Coalescence Step

The second aggregated particle dispersion in which the second aggregated particles are dispersed is then heated to, for example, a temperature equal to or higher than the glass transition temperature of the polyester resin (for example, a temperature equal to or higher than the glass transition temperature of the polyester resin by 10° C. to 50° C.) to coalesce the second aggregated particles, thereby forming toner particles.

Toner particles are obtained through the above steps.

The toner particles may be manufactured, after obtaining a second aggregated particle dispersion in which the second aggregated particles are dispersed, through a step of mixing the second aggregated particle dispersion with a polyester resin particle dispersion in which polyester resin particles are dispersed to cause the polyester resin particles to be aggregated and adhered to the surface of the second aggregated particles and to form third aggregated particles, and a step of heating the third aggregated particle dispersion in which the third aggregated particles are dispersed to cause the third aggregated particles to coalesce and to form toner particles.

After the coalescence step ends, the toner particles formed in a solution are subjected to a known washing step, a solid-liquid separation step, and a drying step, thereby obtaining dry toner particles.

The washing step is not particularly limited. However, from the viewpoint of charging properties, displacement washing may be thoroughly performed using deionized water. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

For example, by adding an external additive to the dry toner particles and mixing the external additive and the toner particles together, the toner according to the present exemplary embodiment is manufactured. The mixing may be performed, for example, using a V blender, a Henschel mixer, a Lodige mixer, or the like. Furthermore, coarse particles of the toner may be removed as necessary by using a vibratory sieving machine, a pneumatic sieving machine, or the like.

Electrostatic Charge Image Developer

In the present exemplary embodiment, the electrostatic charge image developer accommodated in the developing unit contains at least the above-mentioned toner. The electrostatic charge image developer may be a one-component developer which contains only the toner or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin; and a resin impregnation-type carrier obtained by impregnating porous magnetic powder with a resin; and the like. Each of the magnetic powder dispersion-type carrier and the resin impregnation-type carrier may be a carrier obtained by coating the surface of a core material, which is particles constituting the carrier, with a resin.

Examples of the magnetic powder include magnetic metals such as iron, nickel, and cobalt; magnetic oxides such as ferrite and magnetite; and the like.

Examples of the conductive particles include metals such as gold, silver, and copper, and particles such as carbon black, titanium oxide, zinc oxide, tin oxide, barium sulfate, aluminum borate, potassium titanate, and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond or a product obtained by modifying the straight silicone resin, a fluororesin, polyester, polycarbonate, a phenol resin, an epoxy resin, and the like. The coating resin and the matrix resin may contain additives such as conductive material.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like. Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the toner and the carrier, represented by toner:carrier, in the two-component developer is, for example, preferably 1:100 to 30:100 and more preferably 3:100 to 20:100.

Cleaning Blade

A cleaning blade used in the image forming apparatus according to the present exemplary embodiment will be described. The cleaning blade has a two-layer structure consisting of an edge layer and a back surface layer, and the edge layer and the back surface layer are constituted of a polyurethane resin. In the cleaning blade, the ratio (Hb/Ha) of the hardness Hb (°) of the edge layer to the hardness Ha (°) of the back surface layer is 0.84 or more and 0.93 or less. In addition, the total amount of F and Si present within 200 nm from the surface of the edge layer, which is brought into contact with the intermediate transfer belt accounts for 75% or more of the total amount of F and Si present within 5 m from the surface.

Ratio (Hb/Ha)

In the cleaning blade, the ratio (Hb/Ha) of the hardness Hb (°) of the edge layer to the hardness Ha (°) of the back surface layer is 0.84 or more and 0.93 or less. In a case where the ratio (Hb/Ha) is within the above range, the followability of the cleaning blade to the facing surface is enhanced, and the occurrence of the stapler mark in the formed image is suppressed. Furthermore, the ratio (Hb/Ha) is, for example, preferably 0.87 or more and 0.90 or less and more preferably 0.88 or more and 0.89 or less.

Hardness of Edge Layer and Back Surface Layer

The hardness Ha of the back surface layer is, for example, preferably 85° or more and 95° or less, more preferably 87° or more and 93° or less, and even more preferably 89° or more and 91° or less. In a case where the hardness of the back surface layer is 85° or more, the occurrence of curling in the cleaning blade is suppressed. In a case where the hardness of the back surface layer is 95° or less, the followability of the cleaning blade to the facing surface is further enhanced.

The hardness Hb of the edge layer is, for example, preferably 75° or more and 85° less than, more preferably 77° or more and 83° or less, and even more preferably 79° or more and 81° or less. In a case where the hardness of the edge layer is 75° or more, excellent cleaning properties are achieved and wear of the cleaning blade is suppressed. In a case where the hardness of the edge layer is less than 85°, the followability of the cleaning blade to the facing surface is further enhanced.

The hardness of each layer of the cleaning blade is measured by the following method.

The hardness is measured by using a type A durometer specified in JIS K7215 (1986) according to a hardness test method shown in JIS K6253 (1997). Specifically, a type A durometer (manufactured by KOBUNSHI KEIKI CO., LTD.) specified in JIS K7215 (1986) is used to press a push needle (indenter) against the contact portion, and the maximum value of the pointer is read within 1 second. Then, this measurement is repeated 5 times, and the JIS-A hardness of the contact portion is obtained from the average value.

In a case where the contact portion of the edge layer of the cleaning blade is subjected to the modification treatment described later, the site where the modification treatment is applied is set as the target for measuring the hardness. However, it is considered that the hardness is substantially the same between the site where the modification treatment described later is applied and the site where the modification treatment is not applied.

Surface Layer Ratio of F and Si

In the cleaning blade, a ratio (surface layer ratio of F and Si) of the total amount of F and Si present within 200 nm from the surface (contact portion) which is brought into contact with the intermediate transfer belt of the edge layer to the total amount of F and Si present within 5 μm from the surface is 75% or more. In a case where the surface layer ratio of F and Si in the contact portion of the cleaning blade is 75% or more, the behavior of the cleaning blade is stabilized at the tip of the contact portion and the occurrence of toner filming on the surface of the intermediate transfer belt is suppressed. The surface layer ratio of F and Si in the contact portion of the cleaning blade is, for example, preferably 85% or more and more preferably 90% or more.

Amount of surface F and Si

The total amount of F and Si (the amount of surface F and Si) present on the surface (contact portion) of the cleaning blade which is brought in contact with the intermediate transfer belt of the edge layer is, for example, preferably 15 atm % or more, more preferably 18 atm % or more, and even more preferably 20 atm % or more. In a case where the amount of surface F and Si in the contact portion of the cleaning blade is 15 atm % or more, the behavior of the cleaning blade is further stabilized at the tip of the contact portion and the occurrence of toner filming on the surface of the intermediate transfer belt is further suppressed.

The upper limit value of the amount of the surface F and Si in the contact portion of the cleaning blade is not particularly limited, but is, from the viewpoint of suppressing the faulty cleaning due to the belly contact state by the insufficient tack at the tip portion due to decrease of the friction coefficient, preferably 25 atm % or less and more preferably 22 atm % or less.

Amount of 50 nm position F and Si

The total amount of F and Si (the amount of 50 nm position F and Si) present at a position of 50 nm from the surface (contact portion) of the cleaning blade which is brought in contact with the intermediate transfer belt of the edge layer is, for example, preferably 0.3 atm % or more, more preferably 0.5 atm % or more, and even more preferably 1.0 atm % or more. In a case where the amount of the 50 nm position F and Si of the cleaning blade is 0.3 atm % or more, low friction at the contact portion of the cleaning blade is maintained, and the occurrence of toner filming on the surface of the intermediate transfer belt is suppressed even at a lapse of time.

The upper limit value of the amount of the 50 nm position F and Si of the cleaning blade is not particularly limited, but is, from the viewpoint of suppressing the local wear, preferably 7 atm % or less and more preferably 5 atm % or less.

A method of measuring a ratio (surface layer ratio of F and Si) of the total amount of F and Si present within 200 nm from the surface (contact portion) which is brought into contact with the intermediate transfer belt of the edge layer to the total amount of F and Si present within 5 m from the surface in the cleaning blade will be described. That is, a method of analyzing the amount of F element and the amount of Si element in the depth direction from the contact portion in the edge layer of the cleaning blade will be described.

A region including a surface (contact portion) of the cleaning blade which is brought into contact with the intermediate transfer belt of the edge layer is cut out, and an amount (atm %) of each of N, C, O, F, and Si elements is measured with XPS (Versa Probe II, manufactured by Ulvac-PHI, Inc.) in the depth direction from the contact portion.

In addition, the total amount of F and Si present on the surface (contact portion) of the cleaning blade which is brought into contact with the intermediate transfer belt of the edge layer is obtained by calculating the ratio from the equation of SB/SA×100 in a case where the area up to a depth of 5 μm is defined as SA and the area up to a depth of 200 nm is defined as SB in the plot of the depth from the contact portion and the element ratio of the cleaning blade, which are obtained by the above-mentioned analysis in the depth direction. The total amount of F and Si present at a position of 50 nm from the surface (contact portion) of the cleaning blade which is brought into contact with the intermediate transfer belt of the edge layer is also obtained in the same manner.

Constitution

In the present exemplary embodiment, a cleaning blade having a two-layer structure of an edge layer and a back surface layer is used. That is, a cleaning blade provided with the edge layer including a contact portion which is brought into contact with the intermediate transfer belt and the back surface layer formed on the back surface side of the edge layer and consisting of a material different from the edge layer is used.

Both the edge layer and the back surface layer of the cleaning blade are constituted of a polyurethane resin.

Polyurethane Resin

The polyurethane resin is a polyurethane resin obtained by polymerizing at least a polyol component and a polyisocyanate component. The polyurethane resin may be, as necessary, polyurethane resin obtained by polymerizing a resin containing a functional group capable of reacting with an isocyanate group of a polyisocyanate in addition to the polyol component.

The polyurethane resin preferably includes, for example, a hard segment and a soft segment. The term "hard segment" denotes, among polyurethane resin materials, a segment in which the material constituting the hard segment is relatively harder than the material constituting the soft segment, and the term "soft segment" denotes a segment in which the material constituting the soft segment is relatively softer than the material constituting the hard segment.

Examples of the material constituting the hard segment (hard segment material) include low-molecular-weight polyol components among polyol components and resins containing a functional group capable of reacting with an isocyanate group of a polyisocyanate. On the other hand, examples of the material constituting the soft segment (soft segment material) include high-molecular-weight polyol components among polyol components.

The average particle size of aggregates of the hard segment is, for example, preferably 1 μm or more and 10 μm or less, and more preferably 1 μm or more and 5 μm or less.

In a case where the average particle size of the aggregates of the hard segment is 1 μm or more, the frictional resistance of the surface of the contact member is likely to be reduced. Therefore, the behavior of the blade is stabilized, and local wear is likely to be suppressed.

On the other hand, in a case where the average particle size of the aggregates of the hard segment is 10 μm or less, the occurrence of chipping is likely to be suppressed.

The average particle size of the aggregates of the hard segment is measured as follows. By using a polarizing microscope (BX51-P manufactured by Olympus Corporation), an image is captured at 20× magnification, and image processing is performed to convert the image into a binary image. For each of 20 cleaning blades, particle sizes (equivalent circle diameters) of aggregates are measured at 5 spots (at each spot, particle sizes of 5 aggregates are measured), and the average particle size of the 500 aggregates is calculated.

Further, the binarization of the image is carried out by adjusting the thresholds of the hue, the chroma, and the brightness using image processing software OLYMPUS Stream essentials (manufactured by Olympus Corporation) such that the color of the aggregates of the crystal part and the hard segment is black and the color of the amorphous part (corresponding to the soft segment) is white.

Polyol Component

The polyol component contains a high-molecular-weight polyol and a low-molecular-weight polyol.

The high-molecular-weight polyol component is a polyol having a number-average molecular weight of 500 or more (for example, preferably 500 or more and 5,000 or less).

Examples of the high-molecular-weight polyol component include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of high-molecular-weight polyols include PLACCEL 205 and PLACCEL 240 manufactured by Daicel Corporation.

Here, the number-average molecular weight is a value measured by a gel permeation chromatography (GPC) method. The same applies hereinafter.

These high-molecular-weight polyols may be used alone or in combination of two or more kinds thereof.

The polymerization ratio of the high-molecular-weight polyol component is, for example, preferably 30% by mole or more and 50% by mole or less and is preferably 40% by mole or more and 50% by mole or less with respect to the total polymerization component of the polyurethane resin.

The low-molecular-weight polyol component is a polyol having a molecular weight (number-average molecular weight) of less than 500. The low-molecular-weight polyol is a material that functions as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, for example, 1,4-butanediol is preferably employed as the low-molecular-weight polyol component.

Examples of the low-molecular-weight polyol component include a diol (bifunctional), a triol (trifunctional), and a tetraol (tetrafunctional), which are known as chain extenders and crosslinking agents.

These polyols may be used alone or in combination of two or more kinds thereof.

The polymerization ratio of the low-molecular-weight polyol components to the total polymerization components of the polyurethane resin may be, for example, more than 50% by mole and 75% by mole or less, preferably 52% by mole or more and 75% by mole or less, more preferably 55% by mole or more and 75% by mole or less, and even more preferably 55% by mole or more and 60% by mole or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3'-dimethylbiphenyl-4,4'-diisocyanate (TODI).

As the polyisocyanate component, for example, 4,4'-diphenylmethane diisocyanate (MDI), 1,5-naphthalene diisocyanate (NDI), or hexamethylene diisocyanate (HDI) is more desirable.

These polyisocyanate components may be used alone or in combination of two or more kinds thereof.

The polymerization ratio of the polyisocyanate component to the total polymerization components of the polyurethane resin may be, for example, 5% by mole or more and 25% by mole or less, and preferably 10% by mole or more and 20% by mole or less.

Resin Containing Functional Group Capable of Reacting with Isocyanate Group

As the resin containing a functional group capable of reacting with an isocyanate group (hereinafter, referred to as "functional group-containing resin"), for example, a resin having flexibility is desirable, and an aliphatic resin having a linear structure is more desirable from the viewpoint of flexibility. Specific examples of the functional group-containing resin include an acrylic resin containing two or more hydroxyl groups, a polybutadiene resin containing two or more hydroxyl groups, and an epoxy resin containing two or more epoxy groups.

Examples of commercially available products of the acrylic resin containing two or more hydroxyl groups include ACTFLOW (grades: UMB-2005B, UMB-2005P, UMB-2005, UME-2005, and the like, manufactured by Soken Chemical & Engineering Co., Ltd.).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is desirable which is not hard and brittle just as the general epoxy resins of the related art and is more flexible and tougher than the epoxy resin of the related art. As such an epoxy resin, for example, in view of molecular structure, an epoxy resin is preferable which has a structure (flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In addition, in terms of the physical properties, compared to the epoxy resin of the related art, for example, an epoxy resin having a low viscosity relative to the molecular weight is preferable. Specifically, for example, the weight-average molecular weight is in a range of 900±100 and the viscosity at 25° C. is desirably in a range of 15,000±5,000 mPa·s and more desirably in a range of 15,000±3,000 mPa·s. Examples of commercially available products of the epoxy resin having the above-described characteristics include EPICLON EXA-4850-150 (manufactured by DIC Corporation).

The polymerization ratio of the functional group-containing resin may be, for example, within a range not impairing the characteristics of the cleaning blade.

Manufacturing Method of Polyurethane Resin

In the manufacturing method of polyurethane resin, a general manufacturing method of polyurethane such as a prepolymer method or a one-shot method. From the viewpoint of obtaining polyurethane having excellent abrasion resistance and excellent chipping resistance, the prepolymer method is preferable for the present exemplary embodiment, but the manufacturing method is not limited thereto.

The cleaning blade is produced by molding a composition for forming a cleaning blade prepared by the above method into a sheet by using, for example, centrifugal molding, extrusion molding, or the like and processing the sheet by cutting or the like.

Examples of the catalyst used for producing the polyurethane resin include an amine-based compound such as a tertiary amine, a quaternary ammonium salt, and an organometallic compound such as an organic tin compound.

Examples of the tertiary amine include trialkylamine such as triethylamine, tetraalkyl diamine such as N,N,N',N'-tetramethyl-1,3-butanediamine, aminoalcohol such as dimethylethanolamine, esteramine such as ethoxylated amine, ethoxylated diamine, or bis(diethylethanolamine)adipate, a cyclohexylamine derivative such as triethylenediamine (TEDA) or N,N-dimethylcyclohexylamine, a morpholine derivative such as N-methylmorpholine or N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium octylate, 1,5-diazabicyclo[4.3.0]nonen-5 (DBN) octylate, 1,8-diazabicyclo[5.4.0]undec-7 (DBU)-octylate, DBU-oleate, DBU-p-toluenesulfonate, DBU-formate, and 2-hydroxypropyltrimethylammonium formate.

Examples of the organic tin compound include a dialkyltin compound such as dibutyltin dilaurate or dibutyltin di(2-ethylhexoate), stannous 2-ethylcaproate, and stannous oleate.

Among these catalysts, in view of hydrolysis resistance, triethylenediamine (TEDA), which is a tertiary ammonium salt, is used. Furthermore, in view of processability, a quaternary ammonium salt is used. Among the quaternary ammonium salts, 1,5-diazabicyclo[4.3.0]nonen-5 (DBN) octylate, 1,8-diazabicyclo[5.4.0]undec-7 (DBU)-octylate, or DBU-formate with high reaction activity is used.

The content of the catalyst is, for example, preferably in a range of 0.0005% by mass or more and 0.03% by mass or less and particularly preferably 0.001% by mass or more and 0.01% by mass or less of the entire polyurethane resin constituting the contact member.

These may be used alone or in combination of two or more kinds thereof.

Production of Cleaning Blade with Two-Layer Structure

The edge layer and the back surface layer are integrally molded by a centrifugal molding method. First, the molten material of the back surface layer is injected into the centrifugal molding drum, and the centrifugal molding drum is rotated. As a result, the material of the back surface layer spreads uniformly on the inner peripheral surface of the centrifugal molding drum and gradually solidifies. Then, before the material of the back surface layer is completely solidified (while the material has tackiness), the molten material of the edge layer is injected into the centrifugal molding drum, and the material is solidified while rotating the centrifugal molding drum. Then, the solidified material is taken out from the centrifugal molding drum, and the cleaning blade is cut out.

The cleaning blade having a two-layer structure of an edge layer and a back surface layer can be produced by manufacturing an edge layer and a back surface layer by the manufacturing method of a polyurethane resin, and bonding the obtained edge layer and back surface layer to each other.

Examples of the method in which the hardness of the edge layer and the hardness of the back surface layer are set to be different include a method of changing the material of the polyurethane resin, and include, for example, a method of changing the ratio of the hard segment and the soft segment.

Modification Treatment of Contact Portion

In the present exemplary embodiment, since the ratio (surface layer ratio of F and Si) of the total amount of F and Si present within 200 nm from the surface (contact portion) of the cleaning blade which is brought in contact with the intermediate transfer belt of the edge layer to the total amount of F and Si present within 5 μm from the surface is set to the above-mentioned range, for example, a modified layer obtained by impregnating the contact portion in the edge layer of the obtained cleaning blade with at least one of a F element or a Si element and performing surface modification treatment is preferably provided.

The modified layer is a layer obtained by impregnating the contact portion of the cleaning blade with a surface treatment liquid containing an isocyanate compound, an organic solvent, and a specific polymer having at least one of a F element or a Si element, and curing the surface treatment liquid (that is, the isocyanate compound and the specific polymer).

The modified layer is formed as a layer integrated with the surface layer of the contact portion such that the density of the layer gradually decreases toward the inside from the surface.

Examples of the isocyanate compound include 2,6-tolylene diisocyanate (TDI), 4,4'-diphenylmethane diisocyanate (MDI), paraphenylenediisocyanate (PPDI), 1,5-naphthalene diisocyanate (NDI), 3,3'-dimethyldiphenyl-4,4'-diisocyanate (TODI), and multimers and modified products of these. Examples of the modified product of the isocyanate compound include a urethane prepolymer in which an isocyanate compound is prepolymerized together with a polyol.

The specific polymer is, for example, preferably a compound that is soluble in a predetermined solvent and that reacts with an isocyanate compound and chemically bonds thereto. Examples of the acrylic polymer having a siloxane bond include a block copolymer of (meth)acrylic acid ester and (meth)acrylic acid siloxane ester and a derivative thereof. "(Meth)acryl" denotes any one or both of acryl and methacryl.

Examples of the acrylic polymer having a fluorine atom include a block copolymer of (meth)acrylic acid ester and fluorinated alkyl (meth)acrylate and a derivative thereof.

The cleaning blade preferably contains, for example, a polymer (silicone-based polymer) having a siloxane bond at a contact portion with the intermediate transfer belt. In addition, from the viewpoint of the solubility in an organic solvent, the specific polymer is, for example, preferably a compound containing a hydroxyl group, an alkyl group, or a carboxyl group.

Examples of a method of confirming that the specific polymer is contained in the surface layer of the contact portion of the cleaning blade and a method of confirming that the specific polymer which is an acrylic polymer is contained in the surface layer include the following methods. Specifically, the confirmation is made by estimating the structure and analyzing the composition of the surface layer material of the contact portion of the cleaning blade by an analysis method such as a Fourier transform infrared spectrophotometer (FTIR) or X-ray photoelectron spectroscopy (XPS).

The content of the specific polymer in the surface treatment liquid is, for example, 8 parts by mass or more and 13 parts by mass or less, and is preferably 9 parts by mass or more and 13 parts by mass or less and more preferably 10 parts by mass or more and 13 parts by mass or less with respect to 100 parts by mass of the isocyanate compound.

As the organic solvent, for example, an organic solvent that dissolves a specific polymer and is compatible with an isocyanate compound is preferable, and specific examples thereof include ethyl acetate, methyl ethyl ketone (MEK), toluene, acetone, and cyclohexanone. In addition, as the organic solvent, a reactive diluent such as 2-hydroxyethyl acrylate, tetrahydrofurfuryl acrylate, 2-hydroxyethyl methacrylate, hydroxypropyl methacrylate, glycidyl methacrylate, neopentyl glycol diacrylate, hexanediol diacrylate, or trimethylolpropane triacrylate may be used.

The modified layer is formed, for example, by impregnating and coating at least the contact portion of the cleaning blade with the surface treatment liquid described above, removing the organic solvent by drying, and forming the cured layer by heat treatment.

An impregnating and coating method is not particularly limited, and examples thereof include typical methods such as a blade coating method, a wire bar coating method, a spray coating method, a dip coating method, a bead coating method, an air knife coating method, and a curtain coating method. In a case where the impregnating and coating method is a dip coating method, the dipping time may be, for example, in a range of 10 seconds or longer and 60 seconds or shorter.

After the impregnation and coating, the surface treatment liquid may be dried, for example, under conditions of a temperature of 20° C. or higher and 30° C. or lower for 1 minute or longer and 10 minutes or shorter. The heat treatment may be performed, for example, under conditions of a temperature of 50° C. or higher and 80° C. or lower for 60 minutes or longer and 90 minutes or shorter.

Pressing Force

The pressing force NF (normal force) for pressing the cleaning blade against the intermediate transfer belt is, for example, preferably 1.5 gf/mm or more and 3.5 gf/mm or less and more preferably 2.0 gf/mm or more and 3.2 gf/mm or less. In a case where the pressing force NF is 1.5 gf/mm or more, the occurrence of the stapler mark in the image is further suppressed, and in a case where the pressing force NF is 3.5 gf/mm or less, the occurrence of toner filming on the surface of the intermediate transfer belt is further suppressed.

The pressing force NF of the cleaning blade is calculated by the following formula.

$$\text{Formula: Pressing force } NF = k \times d$$

Figure 2:
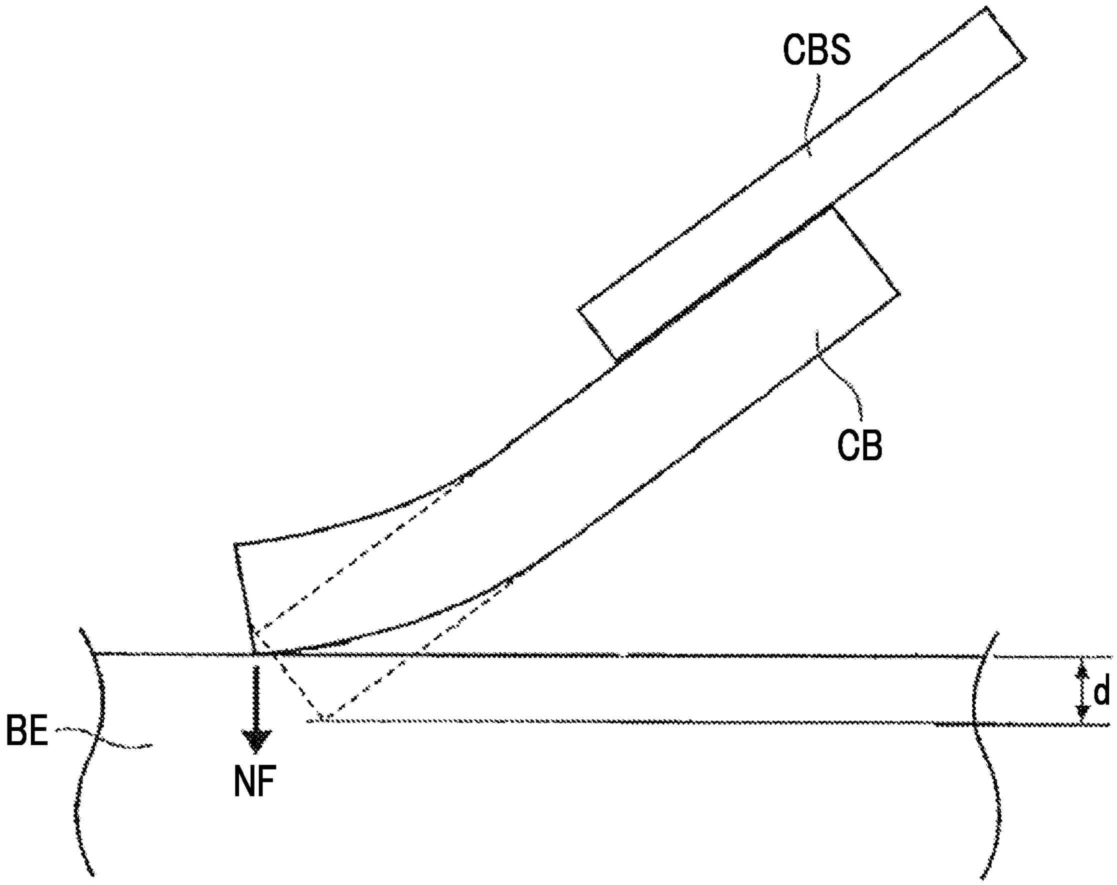
FIG. 2 is a schematic view for illustrating an intrusion d of the cleaning blade into the intermediate transfer belt.

In the formula, k represents a spring constant unique to the cleaning blade, and d represents an intrusion of the cleaning blade into the intermediate transfer belt (see FIG. 2).

The spring constant k unique to the cleaning blade is obtained by causing displacement of a cleaning blade 12 and measuring the load with a load cell.

The intrusion d of the cleaning blade into the intermediate transfer belt is calculated by fixing the cleaning blade 12 to a support member and calculating the amount of displacement of the cleaning blade caused in a case where the cleaning blade is brought into contact with the intermediate transfer belt.

In FIG. 2, BE represents the intermediate transfer belt, CB represents the cleaning blade, and CBS represents the support member that supports the cleaning blade.

The intrusion d of the cleaning blade into the intermediate transfer belt is, for example, preferably 0 mm or more and 10 mm or less, and more preferably 0.01 mm or more and 5 mm or less.

Intermediate Transfer Belt and Transfer Device

Layer Configuration of Intermediate Transfer Belt

Examples of the intermediate transfer belt include a single layer of a polyimide-based resin or a laminate having a polyimide-based resin layer as the outermost surface layer.

For example, the outer peripheral surface of the intermediate transfer belt may be configured with a polyimide-based resin layer.

In a case where the intermediate transfer belt is configured with a laminate having a polyimide-based resin layer as the outermost surface layer, the intermediate transfer belt in which the polyimide-based resin layer is provided on a resin base material layer is adopted.

An interlayer (such as an elastic layer) may be provided between the base material layer and the polyimide-based resin layer.

As the resin base material layer and the interlayer (such as an elastic layer), known layers adopted for intermediate transfer belts are used.

Configuration of Polyimide-Based Resin Layer

The polyimide-based resin layer contains, for example, a polyimide-based resin and conductive carbon particles. The polyimide-based resin layer preferably contains, for example, a release agent.

As necessary, the polyimide-based resin layer may contain other known components.

The polyimide-based resin layer is a layer containing a polyimide-based resin as a component having the greatest mass among the components configuring the resin layer.

Polyimide-Based Resin

The polyimide-based resin means a resin containing a constitutional unit having an imide bond.

Examples of the polyimide-based resin include a polyimide resin, a polyamide-imide resin, and a polyetherimide resin.

From the viewpoint of cleanliness maintainability, as the polyimide-based resin, among the above, for example, a polyimide resin and a polyamide-imide resin are preferable, and a polyimide resin is more preferable.

Examples of the polyimide resin include an imidized polyamic acid (polyimide resin precursor) which is a polymer of a tetracarboxylic dianhydride and a diamine compound.

Examples of the polyimide resin include a resin having a constitutional unit represented by General Formula (I).

General Formula (I)

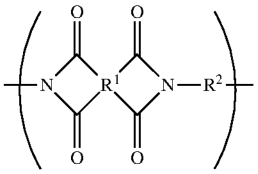

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic dianhydride used as a raw material of the polyimide resin include a pyromellitic dianhydride, a 3,3',4,4'-benzophenone tetracarboxylic dianhydride, a 3,3',4,4'-biphenyltetracarboxylic dianhydride, a 2,3,3',4-biphenyltetracarboxylic dianhydride, a 2,3,6,7-naphthalenetetracarboxylic dianhydride, a 1,2,5,6-naphthalenetetracarboxylic dianhydride, a 1,4,5,8-naphthalenetetracarboxylic dianhydride, a 2,2'-bis(3,4-dicarboxyphenyl)sulfonic dianhydride, a perylene-3,4,9,10-

Tetracarboxylic dianhydride, a bis(3,4-dicarboxyphenyl) ether dianhydride, and an ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(3-amino tert-butyl)toluene, bis(p-p-amino-tert-butylphenyl)ether, bis(p-p-methyl-6-aminophenyl) benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

From the viewpoint of mechanical strength, volume resistivity adjustment, and the like, the content of the polyimide-based resin with respect to the polyimide-based resin layer is, for example, preferably 60% by mass or more and 95% by mass or less, more preferably 70% by mass or more and 95% by mass or less, and even more preferably 75% by mass or more and 90% by mass or less.

Conductive Carbon Particles

Examples of the conductive carbon particles include carbon black.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black.

Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

From the viewpoint of dispersibility, mechanical strength, volume resistivity, film forming properties, and the like, the average particle size of the conductive carbon particles is, for example, preferably 2 nm or more and 40 nm or less, more preferably 8 nm or more and 20 nm or less, and even more preferably 10 nm or more and 15 nm or less.

The average particle size of the conductive carbon particles is measured by the following method.

First, by a microtome, a measurement sample having a thickness of 100 nm is collected from the polyimide-based resin layer and observed with a transmission electron microscope (TEM). Then, the diameters of circles each having an area equivalent to the projected area of each of 50 conductive carbon particles (that is, equivalent circle diameters) are adopted as particle sizes, and the average thereof are adopted as the average particle size.

From the viewpoint of mechanical strength and volume resistivity, the content of the conductive carbon particles is, for example, preferably 10% by mass or more and 50% by mass or less with respect to the polyimide-based resin layer.

Other Components

Examples of other components include a conducting agent other than conductive carbon particles, a filler for improving mechanical strength, an antioxidant for preventing thermal deterioration of a belt, a surfactant for improving fluidity, a heat-resistant antioxidant, and a release agent.

In a case where the polyimide-based resin layer contains other components, the content of the other components with respect to the polyimide-based resin layer is, for example, preferably more than 0% by mass and 10% by mass or less, more preferably more than 0% by mass and 5% by mass or less, and even more preferably more than 0% by mass and 1% by mass or less.

Thickness of Polyimide-Based Resin Layer

In a case where the intermediate transfer belt is configured with a single polyimide-based resin layer, from the viewpoint of mechanical strength, the thickness of the polyimide-based resin layer is, for example, preferably 60 μm or more and 120 μm or less, and more preferably 80 μm or more and 120 μm or less.

In a case where the intermediate transfer belt is configured with a laminate having the polyimide-based resin layer as the outermost surface layer, from the viewpoint of manufacturing suitability and from the viewpoint of suppressing discharge, the thickness of the polyimide-based resin layer is, for example, preferably 1 μm or more and 60 μm or less, and more preferably 3 μm or more and 60 μm or less.

The thickness of the polyimide-based resin layer is measured as follows.

That is, a cross section of the polyimide-based resin layer taken along the thickness direction is observed with an optical microscope or a scanning electron microscope, the thickness of the layer as a measurement target is measured at 10 sites, and the average thereof is adopted as the thickness.

Volume Resistivity of Intermediate Transfer Belt

From the viewpoint of transferability, the common logarithm of the volume resistivity that the intermediate transfer belt has in a case where a voltage of 500 V is applied thereto for 10 seconds is, for example, 9.0 (log Ω·cm) or more and 13.5 (log Ω·cm) or less, more preferably 9.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Surface Resistivity of Intermediate Transfer Belt

From the viewpoint of transferability to embossed paper, the common logarithm of the surface resistivity that the intermediate transfer belt has in a case where a voltage of 500 V is applied to the outer peripheral surface thereof for 10 seconds is, for example, preferably 10.0 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit log Ω/sq. of the surface resistivity represents the surface resistivity using the logarithmic value of the resistance value per unit area, which is also written as log(Q/sq.), log Ω/square, log Ω/Q/□, or the like.

The surface resistivity that the intermediate transfer belt has in a case where a voltage of 500 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/suq.) of the outer peripheral surface of the intermediate transfer belt is measured at a total of 18 spots within the outer peripheral surface of the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Primary Transfer Device

In the primary transfer device, the primary transfer member is arranged to face the image holder across the intermediate transfer belt. In the primary transfer device, by the primary transfer member, a voltage with polarity opposite to charging polarity of a toner is applied to the intermediate transfer belt, such that primary transfer of a toner image to the outer peripheral surface of the intermediate transfer belt is performed.

Secondary Transfer Device

In the secondary transfer device, the secondary transfer member is arranged on a toner image-holding side of the intermediate transfer belt. The secondary transfer device includes, for example, a secondary transfer member and a back surface member that is arranged on the side opposite to the toner image-holding side of the intermediate transfer belt.

In the secondary transfer device, the intermediate transfer belt and the recording medium are interposed between the secondary transfer member and the back surface member, and a transfer electric field is formed. In this way, secondary transfer of the toner image formed on the intermediate transfer belt to the recording medium is performed.

The secondary transfer member may be a secondary transfer roll or a secondary transfer belt. As the back surface member, for example, a back roll is used.

Other Configurations of Transfer Device

The present exemplary embodiment may be a transfer device that transfers a toner image to the surface of a recording medium via a plurality of intermediate transfer belts. That is, the transfer device may be, for example, a transfer device of performing primary transfer of a toner image to a first intermediate transfer belt from an image holder, performing secondary transfer of the toner image to a second intermediate transfer belt from the first intermediate transfer belt, and then performing tertiary transfer of the toner image to a recording medium from the second intermediate transfer belt.

As at least one of the plurality of intermediate transfer belts of the transfer device, the intermediate transfer belt according to the present exemplary embodiment is used.

Configuration of Image Forming Apparatus

The image forming apparatus according to the present exemplary embodiment includes an image holder, a charging unit that charges the surface of the image holder, an electrostatic charge image forming unit that forms an electrostatic charge image on the charged surface of the image holder, a developing unit that accommodates an electrostatic charge image developer containing a toner having toner particles and that develops the electrostatic charge image formed on the surface of the image holder as a toner image by the electrostatic charge image developer, an intermediate transfer belt that has an outer peripheral surface to which the toner image is to be transferred, a primary transfer unit that has a primary transfer member performing primary transfer of the toner image formed on the surface of the image holder to the outer peripheral surface of the intermediate transfer belt, a secondary transfer unit that has a secondary transfer member performing secondary transfer of the toner image transferred to the outer peripheral surface of the intermediate transfer belt by the primary transfer to a surface of a recording medium, and a cleaning device having a cleaning blade which is brought into contact with and cleans an outer peripheral surface of the intermediate transfer belt.

As the image forming apparatus according to the present exemplary embodiment, known image forming apparatuses are used which include an apparatus including a fixing unit that fixes a toner image transferred to the surface of a recording medium; an apparatus including a cleaning device that cleans the surface of an image holder not yet being charged after transfer of a toner image; an apparatus including an electricity removing device that removes electricity by irradiating the surface of an image holder, the image holder not yet being charged, with electricity removing light after transfer of a toner image; an apparatus including an image holder heating member that raises the temperature of an image holder so as to reduce relative temperature, and the like.

The image forming apparatus according to the present exemplary embodiment may be any of a dry development type image forming apparatus or a wet development type (development type using a liquid developer) image forming apparatus.

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Image Forming Method

An image forming method according to the present exemplary embodiment includes a charging step of charging a surface of an image holder, an electrostatic charge image forming step of forming an electrostatic charge image on the surface of the charged image holder, a developing step of developing the electrostatic charge image formed on the surface of the image holder as a toner image by the electrostatic charge image developer containing a toner having toner particles, a primary transfer step of performing a primary transfer of the toner image formed on the surface of the image holder to an outer peripheral surface of the intermediate transfer belt, a secondary transfer step of performing a secondary transfer of the toner image transferred to the outer peripheral surface of the intermediate transfer belt by the primary transfer to a surface of a recording medium, and a cleaning step of bringing a cleaning blade into contact with an outer peripheral surface of the intermediate transfer belt and cleaning the outer peripheral surface of the intermediate transfer belt.

In the toner particles, the release agent present in a region within 800 nm from a surface of the toner particles is 70% or more of the release agent in the entire toner particles and a melting temperature of the release agent is 65° C. or higher and 80° C. or lower.

The cleaning blade has a two-layer structure consisting of an edge layer and a back surface layer, and the edge layer and the back surface layer are constituted of a polyurethane resin. In addition, in the cleaning blade, ratio (Hb/Ha) of the hardness Hb (°) of the edge layer to the hardness Ha (°) of the back surface layer is 0.84 or more and 0.93 or less, and the total amount of F and Si present within 200 nm from the surface of the edge layer, which is brought into contact with the intermediate transfer belt accounts for 75% or more of the total amount of F and Si present within 5 m from the surface.

Hereinafter, an example of the image forming apparatus and the image forming method according to the present exemplary embodiment will be described with reference to drawings. Here, the image forming apparatus and the image forming method according to the present exemplary embodiment are not limited thereto. Further, main parts shown in the figures will be described, but description of other parts will not be provided.

FIG. 1 is a schematic configuration view showing the configuration of the image forming apparatus according to the present exemplary embodiment.

As shown in FIG. 1, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control unit 40 that controls the operation of each device (each portion).

Each of the image forming units 1Y, 1M, 1C, and 1K of the image forming apparatus 100 includes a photoreceptor 11 (an example of an image holder) that holds the toner image formed on the surface thereof and rotates in the direction of an arrow A.

As an example of a charging unit, a charger 12 for charging the photoreceptor 11 is provided around the photoreceptor 11. As an example of an electrostatic charge image forming unit, a laser exposure machine 13 that draws an electrostatic charge image on the photoreceptor 11 is provided (in the figure, an exposure beam is represented by a mark Bm).

Around the photoreceptor 11, as an example of a developing unit, there are provided a developing machine 14 that accommodates toners of each color component and makes the electrostatic charge image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 1 at a speed fit for the purpose. As the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided to face an intermediate transfer belt-cleaning blade 35 scrapping off the residual toner on the intermediate transfer belt 15 are provided.

The primary transfer portion 10 is configured with the primary transfer roll 16 that is arranged to face the photoreceptor 11 across the intermediate transfer belt 15. Then, the primary transfer roll 16 is arranged to be pressed on the photoreceptor 11 with the intermediate transfer belt 15 interposed therebetween, and is configured such that a voltage (primary transfer bias) with an opposite polarity to a charging polarity (minus polarity and the same applies below) of the toner is applied to the primary transfer roll 16. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 comprises the back roll 25 and a secondary transfer roll 22 that is arranged on a toner image-holding surface side of the intermediate transfer belt 15.

The back roll 25 is formed such that the surface resistivity thereof is $1\times10^{7}$ Ω/□ or more and $1\times10^{10}$Ω/□ or less. The hardness of the back roll 25 is set to, for example, 700 (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ω·cm or more and $10^{8.5}$ Ω·cm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, the intermediate transfer belt-cleaning blade 35 separable from the intermediate transfer belt 15 is provided which removes the residual toner or paper powder on the intermediate transfer belt 15 remaining after the secondary transfer and cleans the outer peripheral surface of the intermediate transfer belt 15.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the outer peripheral surface of the intermediate transfer belt 15. Examples of the secondary transfer roll-cleaning member 22A include a cleaning blade. The secondary transfer roll-cleaning member 22A may be a cleaning roll.

The intermediate transfer belt 15, the primary transfer roll 16, the secondary transfer roll 22, and the intermediate transfer belt-cleaning blade 35 correspond to an example of the transfer device.

The image forming apparatus 100 may have a configuration in which the apparatus includes a secondary transfer belt (an example of a secondary transfer member) instead of the secondary transfer roll 22.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control unit 40 based on the recognition of the reference signal.

The image forming apparatus according to the present exemplary embodiment includes, as a transport unit for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment, that is, an image forming method will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic charge image is formed. By each of the image forming units 1Y, 1M, 1C, and 1K, the formed electrostatic charge image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the base material of the intermediate transfer belt 15, and the toner images are sequentially overlapped on the outer peripheral surface of the intermediate transfer belt 15 and subjected to primary transfer.

After the primary transfer by which the toner images are sequentially transferred to the outer peripheral surface of the intermediate transfer belt 15, the intermediate transfer belt 15 moves, and the toner images are transported to the secondary transfer portion 20. In a case where the toner images are transported to the secondary transfer portion 20, in the transport unit, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, so that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an output portion of the image forming apparatus.

After the transfer to the paper K is finished, the residual toner remaining on the intermediate transfer belt 15 is transported to the intermediate transfer belt-cleaning blade 35 as the intermediate transfer belt 15 rotates, and is removed from the intermediate transfer belt 15 by the intermediate transfer belt-cleaning blade 35.

Hitherto, the present exemplary embodiment has been described. However, the present exemplary embodiment is not limited to the above exemplary embodiments, and various modifications, changes, and ameliorations can be added thereto.

EXAMPLES

Examples of the present disclosure will be described below, but the present disclosure is not limited to the following examples. In the following description, all "parts" and "%" are in terms of mass unless otherwise specified.

Example 1

Preparation of Electrostatic Charge Image Developer

Preparation of Amorphous Polyester Resin Dispersion

Preparation of Polyester Resin Dispersion (APE1)

Terephthalic acid: 30 parts by mole
Fumaric acid: 70 parts by mole
Ethylene oxide adduct of bisphenol A: 5 parts by mole
Propylene oxide adduct of bisphenol A: 95 parts by mole The above materials are put in a flask with an inner capacity of 5 liter equipped with a stirrer, a nitrogen introduction tube, a temperature sensor, and a rectifying column, the temperature is raised to 210° C. for an hour, and titanium tetraethoxide is added thereto in an amount of 1 part with respect to 100 parts of the above materials. While the generated water is being distilled off, the temperature is raised to 230° C. for 0.5 hours, a dehydration condensation reaction is continued for 1 hour at 230° C., and then the reactant is cooled. In this manner, a polyester resin having a weight-average molecular weight of 18,500, an acid value of 14 mgKOH/g, and a glass transition temperature of 59° C. is synthesized.

Ethyl acetate (40 parts) and 25 parts of 2-butanol are put in a container equipped with a temperature control unit and a nitrogen purge unit, thereby preparing a mixed solvent. Then, 100 parts of the polyester resin is slowly added to and dissolved in the solvent, a 10% by mass aqueous ammonia solution (in an amount equivalent to 3 times the acid value of the resin in terms of molar ratio) is added thereto, and the mixed solution is stirred for 30 minutes.

Thereafter, the container is cleaned out by dry nitrogen purging, and in a state where the mixed solution is being stirred at a temperature kept at 40° C., 400 parts of deionized water is added dropwise thereto at a rate of 2 parts/min such that the mixed solution is emulsified. After the dropwise addition ends, the temperature of the emulsion is returned to room temperature (20° C. to 25° C.), and bubbling is performed under stirring for 48 hours by using dry nitrogen, thereby obtaining a resin particle dispersion in which the concentration of ethyl acetate and 2-butanol is reduced to 1,000 ppm or less and the resin particles having the volume-average particle size of 200 nm is dispersed. Deionized water is added to the resin particle dispersion, and the solid content thereof is adjusted to 20% by mass, thereby obtaining a polyester resin particle dispersion (APE1).

Preparation of Colorant Particle Dispersion

Preparation of Colorant Particle Dispersion (Black Pigment Dispersion)

Carbon black (Regal 330, manufactured by Cabot Corporation): 250 parts
Anionic surfactant (NEOGEN SC, manufactured by DKS Co. Ltd.): 33 parts (60% of active ingredient, 8% with respect to colorant)
Deionized water: 750 parts 280 parts of deionized water and 33 parts of anionic surfactant are placed in a stainless steel container having a size such that the height of the liquid surface becomes about ⅓ of the height of the container in a case where all the above components are put therein. After the surfactant is sufficiently dissolved, all the solid solution pigments are added, and the mixture is stirred using a stirrer until the non-wet pigment disappears, and sufficiently defoamed. After defoaming, the remaining deionized water is added, and the mixture is dispersed at 5,000 rpm for 10 minutes using a homogenizer (T50 ULTRA-TURRAX manufactured by IKA), and then defoamed by stirring with a stirrer for 1 day and night. After defoaming, the mixture is dispersed again at 6,000 rpm for 10 minutes using the homogenizer, and then defoamed by stirring with a stirrer for 1 day and night. Subsequently, the dispersion is dispersed at a pressure of 240 MPa using a high-pressure impact disperser Ultimizer (HJP30006, manufactured by SUGINO MACHINE LIMITED CO., LTD.). Dispersion is performed corresponding to 25 passes in terms of the total charge amount and the processing capacity of the apparatus. The obtained dispersion is left to stand for 72 hours to remove a precipitate, and deionized water is added to adjust the solid content concentration to 15%, thereby obtaining a colorant particle dispersion. The volume-average particle size D50 of the particles in the colorant particle dispersion is 135 nm.

Preparation of Release Agent Dispersion

Preparation of Release Agent Dispersion (WAX1)

Paraffin-based wax (manufactured by NIPPON SEIRO CO., LTD., HNP9, melting temperature of 75° C.): 270 parts
Anionic surfactant (manufactured by DKS Co. Ltd., NEOGEN RK, amount of active ingredient: 60%): 13.5 parts (as active ingredient, 3.0% with respect to release agent)
Deionized water: 21.6 parts The above components are mixed, subjected to a dispersion treatment at a dispersion pressure of 5 MPa for 120 minutes and further at 40 MPa for 360 minutes with a pressure discharge type homogenizer (Gaulin homogenizer, manufactured by Gaulin) after a release agent is dissolved at an internal fluid temperature of 120° C., and cooled, thereby obtaining a release agent dispersion (WAX1). The volume-average particle size D50 of the particles in the release agent dispersion (WAX1) is 225 nm. Then, deionized water is added to adjust the solid content concentration to 20.0%.

Preparation of Mixed Particle Dispersion

Preparation of Mixed Particle Dispersion (RW1)

After mixing 150 parts of the polyester resin particle dispersion (APE1), 20 parts of the release agent particle dispersion (WAX1), and 2.9 parts of an anionic surfactant (Dowfax2A1 manufactured by The Dow Chemical Company), pH of the mixture is adjusted to 3.0 by adding 1.0% nitric acid under a temperature of 25° C., thereby obtaining the mixed particle dispersion (RW1).

Preparation of Toner

Polyester resin particle dispersion (APE1): 700 parts
Colorant particle dispersion: 133 parts
Deionized water: 400 parts
Anionic surfactant (Dowfax2A1 manufactured by The Dow Chemical Company): 2.9 parts The above components are placed in a 3 liter reaction container equipped with a thermometer, a pH meter, and a stirrer, and pH of the components is adjusted to 3.0 by adding 1.0% nitric acid at a temperature of 25° C. Then while dispersing at 5,000 rpm using a homogenizer (manufactured by IKA Japan: T50 ULTRA-TURRAX), 130 parts of the prepared aqueous aluminum sulfate solution is added and dispersed for 6 minutes.

Then, a stirrer and a mantle heater are installed in the reaction container, and while the rotation speed of the stirrer is adjusted such that the slurry is sufficiently stirred, the solution is heated at a temperature rising rate of 0.2° C./min up to a temperature of 40° C. and at a temperature rising rate of 0.05° C./min after exceeding 40° C., and the particle size is measured every 10 minutes with Multisizer II (aperture size: 50 μm, manufactured by Beckman Coulter Inc.). The reaction container is kept at the temperature at which the volume-average particle size has reached 5.0 m, and 450 parts of the mixed particle dispersion (RW1) is added thereto for 5 minutes. After holding for 30 minutes, the pH is adjusted to 9.0 using a 1% aqueous sodium hydroxide solution. Then, the temperature is raised to 85° C. at a heating rate of 1° C./min and maintained while adjusting the pH to 9.0 at every 5° C. in the same manner. As a result of observing the shape and surface properties of the particles with an optical microscope and a scanning electron microscope (FE-SEM), the coalescence of the particles is confirmed after 5.0 hours. Therefore, the container is cooled to 30° C. for 5 minutes with cooling water.

The cooled slurry is allowed to pass through a nylon mesh having a mesh opening of m to remove coarse powder, and the toner slurry that has passed through the mesh is vacuum-filtered with an aspirator. The toner remaining on the filter paper is finely crushed by hand, added to deionized water in an amount of 10 times the toner at a temperature of 30° C., and the solution is mixed by being stirred for 30 minutes. Then, the solution is vacuum-filtered with an aspirator, the toner remaining on the filter paper is finely crushed by hand and added to deionized water in an amount of 10 times the toner at a temperature of 30° C., and the solution is mixed by being stirred for 30 minutes and vacuum-filtered with an aspirator again, and the electrical conductivity of the filtrate is measured. This operation is repeated until the electrical conductivity of the filtrate becomes 10 S/cm or less, and the toner are washed. The washed toner is finely crushed with a wet dry granulator (Comil) and vacuum-dried in an oven at 35° C. for 36 hours, thereby obtaining toner particles.

Then, 3.3 parts of silica particles are added as an external additive to 100 parts of toner particles. Next, the mixture is mixed at a peripheral speed of 30 m/s for 3 minutes using a Henschel mixer. Then, the mixture is sieved using a vibration sieve having an opening size of 45 m, thereby obtaining a toner.

Production of Carrier 500 parts of spherical magnetite particle powder having a volume-average particle size of 0.18 m is added to a Henschel mixer, and sufficiently stirred. Then, 5 parts of a titanate-based coupling agent is added, the temperature is raised to 95° C., and the mixture is mixed and stirred for 30 minutes. As a result, spherical magnetite particles coated with a titanate-based coupling agent are obtained.

Subsequently, 6 parts of phenol, 10 parts of 30% formalin, 500 parts of the magnetite particles, 7 parts of 25% ammonia water, and 400 parts of water are added to a 1 L four-neck flask and mixed and stirred. Next, the temperature is raised to 90° C. in 60 minutes with stirring, the reaction is carried out at the same temperature for 180 minutes, the temperature is cooled to 30° C., 500 ml of water is added, the supernatant is then removed, and the precipitate is washed with water. The precipitate is dried at 180° C. under reduced pressure, and coarse powder is removed by a sieving net having an opening of 106 μm to obtain core material particles having an average particle size of 38 m.

Next, 200 parts of toluene and 35 parts of a styrene-methylmethacrylate copolymer (component molar ratio of 10:90, weight-average molecular weight of 160,000) are stirred for 90 minutes with a stirrer to obtain a coated resin solution. 1,000 parts of core material particles and 70 parts of a coated resin solution are placed in a vacuum degassing type kneader coater (clearance between rotor and wall surface of 35 mm), and the mixture is stirred at 30 rpm for 30 minutes while maintaining 65° C. Then, the temperature is set to 88° C., the pressure is reduced, and toluene distillation, degassing, and drying are performed. Next, the resultant is passed a mesh having an opening of 75 μm.

The shape factor SF2 of the carrier is 104.

Production of Developer 8 parts of the toner and 100 parts of the carrier are mixed together by using a V blender, thereby producing a developer.

Toner Physical Properties

The ratio (surface layer ratio of the release agent) of the release agent present in the region within 800 nm from the surface of the toner particles to the release agent in the entire toner particles is measured by the above-mentioned method. In addition, the melting temperature of the release agent is measured by the above-mentioned method.

Production of Cleaning Blade

A polycaprolactone polyol (manufactured by Daicel Corporation, PLACCEL 205) and a polycaprolactone polyol (manufactured by Daicel Corporation, PLACCEL 240) are used as a hard segment material of a polyol component. Furthermore, an acrylic resin containing two or more hydroxy groups (Soken Chemical & Engineering Co., Ltd., ACTFLOW UMB-2005B) is used as a soft segment material. The aforementioned hard segment material and the soft segment material are mixed together at a ratio of 8:2 (mass ratio).

Then, as an isocyanate compound, 4,4'-diphenylmethane diisocyanate (manufactured by Nippon Polyurethane Industry Co., Ltd., MILLIONATE MT) is added to 100 parts of the mixture of the hard segment material and the soft segment material, and the obtained mixture is reacted at 70° C. for 3 hours in a nitrogen atmosphere. Subsequently, the aforementioned isocyanate compound is further added thereto, and the obtained mixture is reacted at 70° C. for 3 hours in a nitrogen atmosphere, thereby obtaining a prepolymer.

Thereafter, the prepolymer is heated to 100° C. and defoamed under reduced pressure for 1 hour. Then, a mixture of 1,4-butanediol and trimethylolpropane is added to the prepolymer and mixed for 3 minutes such that air bubbles are not created, thereby preparing a composition for forming a back surface layer. The composition for forming a back surface layer is poured into a centrifugal molding machine and subjected to a curing reaction. Then, a back surface layer is formed by cutting the cured resultant into a length of 15 mm and a thickness of 1.5 mm.

Next, an edge layer having a length of 15 mm and a thickness of 0.5 mm is formed in the same manner as the formation of the back surface layer, except that the ratio of the hard segment material and the soft segment material is changed to 7:3 (mass ratio).

The edge layer and the back surface layer are integrally molded in the case of centrifugal molding. That is, a material (composition for forming a back surface layer) in which a back surface layer is melted is injected into a centrifugal molding machine, and the centrifugation machine is rotated. Before the composition for forming the back surface layer is completely solidified (while the material has tackiness), a material in which the edge layer is melted is injected into a centrifugal molding machine, and the material is solidified and integrally molded while rotating the centrifugal molding machine to obtain a cleaning blade precursor.

Modification Treatment of Contact Portion

The contact portion of the edge layer of the obtained cleaning blade precursor with the intermediate transfer belt is subjected to surface modification treatment with a silicone-based polymer as follows.

As the silicone-based polymer, MODIPER FS770 (product name) manufactured by NOF Corporation is used. The surface modification treatment is performed by dipping the cleaning blade precursor in a surface treatment liquid for 120 seconds, the surface treatment liquid being prepared by dispersing and mixing 20 parts of 4,4'-diphenylmethanediisocyanate (4,4-MIDI) and 2 parts of a silicone-based polymer with 100 parts of methyl ethyl ketone (MEK) for 3 hours using a ball mill. Then, the cleaning blade precursor is taken out and dried in an oven at 50° C.

By the above operation, a cleaning blade having a two-layer structure of an edge layer and a back surface layer, having a surface-modified contact portion with an intermediate transfer belt, and having a length of 15 mm and a thickness of 2 mm is obtained.

Cleaning Blade Physical Properties

In the cleaning blade, a hardness Ha (°) of the back surface layer, a hardness Hb (°) of the edge layer, a ratio (Hb/Ha), a ratio (surface layer ratio of F and Si) of the total amount of F and Si present within 200 nm from the surface which is brought in contact with the intermediate transfer belt of the edge layer to the total amount of F and Si present within 5 μm from the surface, the total amount of F and Si (amount of surface F and Si (atm %)) present on the surface which is brought in contact with the intermediate transfer belt of the edge layer, and total amount of F and Si (amount of 50 nm position F and Si (atm %)) present at a position of 50 nm from the surface which is brought into contact with the intermediate transfer belt of the edge layer are measured by the above-mentioned method.

Preparation of Intermediate Transfer Belt

Carbon black particles are dispersed in a polyamic acid solution, thereby preparing a coating liquid 1. The coating liquid is applied onto a cylindrical mold to form a coating film, followed by a drying treatment (base material 1).

Then, other carbon black particles are dispersed in a polyamic acid solution, thereby preparing a coating liquid 2. The coating liquid 2 is applied onto a base material 1, followed by a drying treatment. Thereafter, the base material 1 is subjected to a baking step and then cut.

By the above operation, a polyimide intermediate transfer belt is obtained.

Image Forming Apparatus

The electrostatic charge image developer, the intermediate transfer belt, and a cleaning blade for an intermediate transfer belt, which are obtained above, are mounted on an image forming apparatus "ApeosPort-VI C7771" manufactured by FUJIFILM Business Innovation Corp.". As conditions for mounting the cleaning blade for a intermediate transfer belt, a pressing force NF (Normal Force, gf/mm) is set to a condition shown in Table 1, and an angle W/A (Working Angle) is set to 10°.

Examples 2 to 9 and Comparative Examples 1 to 8

Preparation of Electrostatic Charge Image Developer

In Example 1, the release agent used for preparing the release agent dispersion is selected, and the amount of the mixed particle dispersion (RW1) at the time of preparing the toner is adjusted. Therefore, toner particles satisfying "the surface layer ratio (%) of the release agent" and "the melting temperature of the release agent (C)", which are described in Tables 1 and 2, are prepared, thereby obtaining an electrostatic charge image developer.

As the release agent having the melting temperature shown in Table 1 and Table 2, the following agents are used alone or in combination.

Paraffin-based wax (manufactured by NIPPON SEIRO CO., LTD., melting temperature of 64° C.)

Paraffin-based wax (manufactured by NIPPON SEIRO CO., LTD., HNP9, melting temperature of 75° C.)

Ester-based wax (manufactured by NOF Corporation, melting temperature of 82° C.)

Fischer-Tropsch wax (manufactured by NIPPON SEIRO CO., LTD., FNP-0090, melting temperature of 90° C.)

Production of Cleaning Blade

In Example 1, the ratio (mass ratio) of the hard segment material and the soft segment material in the formation of the edge layer and the back surface layer is adjusted, the treatment component to be used for the surface modification treatment on the contact portion of the edge layer of the obtained cleaning blade precursor with the intermediate transfer belt is selected, and the conditions of the concentration and the dipping time of the surface modification treatment is adjusted. Therefore, a cleaning blade that satisfies the "back surface layer hardness Ha (°)", "edge layer hardness Hb (°)", "Hb/Ha", "surface layer ratio of F and Si (%)", "amount of surface F and Si (atm %)", and "amount of 50 nm position F and Si (atm %)" shown in Table 1 and Table 2 is produced. In addition, the pressing force NF (gf/mm) in a case of mounting the obtained cleaning blade on the image forming apparatus is set as the conditions shown in Table 1 and Table 2.

The following components are used as the blade treatment components shown in Table 1 and Table 2.

Silicone-based polymer (manufactured by NOF Corporation, MODIPER FS770)

Fluorine compound (manufactured by NOF Corporation, MODIPER F206)

Evaluation Test

Using the image forming apparatus prepared in each of Examples and Comparative Examples, 10,000 sheets of images with an image density of 1% are output in an environment of a temperature of 28° C. and a humidity of 80% RH.

Evaluation of Filming on Intermediate Transfer Belt

The observed image of the surface of the intermediate transfer belt after image output, 100 μm square, is binarized, the area ratio occupied by the deposits is determined, and the evaluation is performed according to the following criteria.

G0: No deposits (adhesion ratio of 0%)

G1: Slight adhesion (adhesion ratio of less than 1%)

G2: Adhesion ratio of 1% or more and less than 3%

G3: Adhesion ratio of 3% or more and less than 5%

G4: Adhesion ratio of 5% or more and less than 10%

G5: Adhesion ratio of 10% or more

Stapler Mark

The presence or absence of a stapler mark in the output image is checked and evaluated according to the following criteria.

A (○): No occurrence

B (x): Occurrence

An unfixed image adjusted such that the toner loading amount is 0.45 mg/cm$^2$ is output by an image forming apparatus from which the fixer is taken out. As a recording medium, OS-coated W paper A4 size (basis weight: 127 gsm) manufactured by FUJIFILM Business Innovation Corp. is used. The output image is an image having a size of 50 mm×50 mm and an image density of 100%.

A device used for evaluating fixing is prepared by detaching a fixing device from ApeosPort-IV C3370 manufactured by FUJIFILM Business Innovation Corp., and modifying the machine so that nip pressure and fixing temperature can be changed. The process speed is set to 175 mm/sec, the obtained fixed image is bent by a weight, and the image quality is evaluated based on the degree of image defect in the portion.

G1: An image defect is not observed at all.

G2: Although an image defect is observed, the defect is mild.

G3: Although an image defect is slightly observed, the defect is acceptable.

G4: An image defect is observed.

TABLE 1

| | | Toner | | Cleaning blade | | | | |
|---|---|---|---|---|---|---|---|---|
| | | Surface layer ratio of release agent (%) | Melting temperature of release agent (° C.) | Hardness Ha of back surface layer (°) | Hardness Hb of edge layer (°) | Hb/Ha | Blade treatment component | Surface layer ratio of F and Si (%) |
| Example | 1 | 75 | 75 | 90 | 80 | 0.89 | Silicone-based polymer | 90 |
| | 2 | 70 | 75 | 90 | 80 | 0.89 | Silicone-based polymer | 80 |
| | 3 | 70 | 80 | 90 | 80 | 0.89 | Fluorine compound | 90 |
| | 4 | 70 | 80 | 86 | 76 | 0.88 | Silicone-based polymer | 90 |
| | 5 | 70 | 80 | 95 | 84 | 0.88 | Silicone-based polymer | 90 |
| | 6 | 70 | 80 | 94 | 79 | 0.84 | Silicone-based polymer | 90 |
| | 7 | 70 | 80 | 88 | 82 | 0.93 | Silicone-based polymer | 90 |
| | 8 | 70 | 65 | 90 | 80 | 0.89 | Silicone-based polymer | 90 |
| | 9 | 75 | 70 | 90 | 80 | 0.89 | Fluorine compound | 85 |

| | | Cleaning blade | | | Evaluation result | | |
|---|---|---|---|---|---|---|---|
| | | Amount of surface F and Si (atm %) | Amount of 50 nm position F and Si (atm %) | Pressing force (gf/mm) | Filming | Stapler mark | Low-temperature fixability |
| Example | 1 | 20 | 1.6 | 2.5 | G0 | A (○) | G1 |
| | 2 | 14 | 0.5 | 3.0 | G1 | A (○) | G1 |
| | 3 | 16 | 0.8 | 3.0 | G2 | A (○) | G2 |
| | 4 | 16 | 1.0 | 3.8 | G3 | A (○) | G2 |
| | 5 | 16 | 1.0 | 1.3 | G3 | A (○) | G2 |
| | 6 | 16 | 1.0 | 3.2 | G3 | A (○) | G2 |
| | 7 | 16 | 1.0 | 2.3 | G3 | A (○) | G2 |
| | 8 | 20 | 1.6 | 2.5 | G2 | A (○) | G1 |
| | 9 | 18 | 1.2 | 3 | G1 | A (○) | G1 |

TABLE 2

| | | Toner | | Cleaning blade | | | | |
|---|---|---|---|---|---|---|---|---|
| | | Surface layer ratio of release agent (%) | Melting temperature of release agent (° C.) | Hardness Ha of back surface layer (°) | Hardness Hb of edge layer (°) | Hb/Ha | Blade treatment component | Surface layer ratio of F and Si (%) |
| Comparative Example | 1 | 65 | 75 | 90 | 80 | 0.89 | Silicone-based polymer | 90 |
| | 2 | 75 | 64 | 90 | 80 | 0.89 | Silicone-based polymer | 90 |
| | 3 | 75 | 89 | 90 | 80 | 0.89 | Fluorine compound | 90 |
| | 4 | 75 | 75 | 90 | 73 | 0.81 | Fluorine compound | 90 |
| | 5 | 75 | 75 | 90 | 86 | 0.96 | Silicone-based polymer | 90 |
| | 6 | 75 | 75 | 84 | 80 | 0.95 | Silicone-based polymer | 90 |
| | 7 | 75 | 75 | 96 | 80 | 0.83 | Fluorine compound | 90 |
| | 8 | 75 | 75 | 90 | 80 | 0.89 | Silicone-based polymer | 70 |

TABLE 2-continued

| | | Cleaning blade | | | Evaluation result | | |
|---|---|---|---|---|---|---|---|
| | | Amount of surface F and Si (atm %) | Amount of 50 nm position F and Si (atm %) | Pressing force (gf/mm) | Filming | Stapler mark | Low-temperature fixability |
| Comparative Example | 1 | 20 | 1.6 | 2.5 | G4 | A (○) | G3 |
| | 2 | 20 | 1.6 | 2.5 | G5 | A (○) | G1 |
| | 3 | 20 | 1.6 | 2.5 | G4 | A (○) | G4 |
| | 4 | 20 | 1.6 | 2.5 | G5 | B (x) | G1 |
| | 5 | 20 | 1.6 | 2.5 | G4 | B (x) | G1 |
| | 6 | 20 | 1.6 | 2.5 | G5 | B (x) | G1 |
| | 7 | 20 | 1.6 | 2.5 | G4 | B (x) | G1 |
| | 8 | 20 | 2.4 | 2.5 | G5 | A (○) | G1 |

As shown in Tables 1 and 2, in the image forming apparatus of the present example, it can be seen that, compared to the comparative examples, the occurrence of toner filming on the surface of the intermediate transfer belt and the occurrence of the stapler mark in the image are suppressed.

The present exemplary embodiment includes the following aspects.

(((1)))

An image forming apparatus comprising:

an image holder;

a charging unit that charges a surface of the image holder;

an electrostatic charge image forming unit that forms an electrostatic charge image on the charged surface of the image holder;

a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower;

an intermediate transfer belt that has an outer peripheral surface to which the toner image is to be transferred;

a primary transfer unit that has a primary transfer member performing primary transfer of the toner image formed on the surface of the image holder to the outer peripheral surface of the intermediate transfer belt;

a secondary transfer unit that has a secondary transfer member performing secondary transfer of the toner image transferred to the outer peripheral surface of the intermediate transfer belt by the primary transfer to a surface of a recording medium; and a cleaning device having a cleaning blade that is brought into contact with and cleans the outer peripheral surface of the intermediate transfer belt and that has a two-layer structure consisting of an edge layer and a back surface layer, in which the edge layer and the back surface layer are constituted of a polyurethane resin, a ratio (Hb/Ha) of a hardness Hb of the edge layer to a hardness Ha of the back surface layer is 0.84 or more and 0.93 or less, and a total amount of F and Si present within 200 nm from a surface of the cleaning blade, which is brought into contact with the intermediate transfer belt of the edge layer, accounts for 75% or more of a total amount of F and Si present within 5 m from the surface.

(((2)))

The image forming apparatus according to (((1))), wherein the release agent present in the region within 800 nm from the surface of the toner particles is 75% or more of the release agent in the entire toner particles.

(((3)))

The image forming apparatus according to (((1))) or (((2))), wherein the melting temperature of the release agent is 70° C. or higher and 75° C. or lower.

(((4)))

The image forming apparatus according to any one of (((1))) or (((3))), wherein the ratio (Hb/Ha) of the hardness Hb of the edge layer to the hardness Ha of the back surface layer of the cleaning blade is 0.87 or more and 0.90 or less.

(((5)))

The image forming apparatus according to any one of (((1))) or (((4))), wherein the hardness Hb of the edge layer is 750 or more and less than 85°, and the hardness Ha of the back surface layer is 85° or more and 950 or less.

(((6)))

The image forming apparatus according to (((5))), wherein the hardness Hb of the edge layer is 77° or more and 83° or less, and the hardness Ha of the back surface layer is 870 or more and 930 or less.

(((7)))

The image forming apparatus according to any one of (((1))) to (((6))), wherein the total amount of F and Si present within 200 nm from the surface of the cleaning blade, which is brought into contact with the intermediate transfer belt of the edge layer, accounts for 85% or more of the total amount of F and Si present within 5 m from the surface.

(((8)))

The image forming apparatus according to any one of (((1))) to (((7))), wherein a total amount of F and Si present on the surface of the cleaning blade, which is brought into contact with the intermediate transfer belt of the edge layer, is 15 atm % or more.

(((9)))

The image forming apparatus according to (((8))), wherein the total amount of F and Si present on the surface of the cleaning blade, which is brought into contact with the intermediate transfer belt of the edge layer, is 18 atm % or more and 25 atm % or less.

(((10)))

The image forming apparatus according to any one of (((1))) to (((9))), wherein a total amount of F and Si present at a position of 50 nm from the surface of the cleaning blade, which is brought into contact with the intermediate transfer belt of the edge layer, is 0.3 atm % or more.

(((11)))

The image forming apparatus according to (((10))), wherein the total amount of F and Si present at the position of 50 nm from the surface of the cleaning blade, which is brought into contact with the intermediate transfer belt of the edge layer, is 0.3 atm % or more and 2.0 atm % or less.

(((12)))

The image forming apparatus according to any one of (((1))) to (((11))), wherein the cleaning blade contains a silicone-based polymer in a surface layer which is brought into contact with the intermediate transfer belt of the edge layer.

(((13)))

The image forming apparatus according to any one of (((1))) to (((12))), wherein the cleaning blade is brought into contact with the intermediate transfer belt with a pressing force of 1.5 gf/mm or more and 3.5 gf/mm or less.

(((14)))

An image forming method comprising:

charging a surface of an image holder;

forming an electrostatic charge image on the charged surface of the image holder;

developing an electrostatic charge image formed on the surface of the image holder as a toner image by an electrostatic charge image developer containing a toner having toner particles, in which a release agent present in a region within 800 nm from a surface of the toner particles is 70% or more of a release agent in entire toner particles and a melting temperature of the release agent is 65° C. or higher and 80° C. or lower;

performing a primary transfer of the toner image formed on the surface of the image holder to an outer peripheral surface of the intermediate transfer belt;

performing a secondary transfer of the toner image transferred to the outer peripheral surface of the intermediate transfer belt by the primary transfer to a surface of a recording medium; and bringing a cleaning blade into contact with the outer peripheral surface of the intermediate transfer belt and cleaning the outer peripheral surface of the intermediate transfer belt, the cleaning blade having a two-layer structure consisting of an edge layer and a back surface layer, in which the edge layer and the back surface layer are constituted of a polyurethane resin, a ratio (Hb/Ha) of a hardness Hb of the edge layer to a hardness Ha of the back surface layer is 0.84 or more and 0.93 or less, and a total amount of F and Si present within 200 nm from the surface which is brought into contact with the intermediate transfer belt of the edge layer accounts for 75% or more of a total amount of F and Si present within 5 μm from the surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image holder;

a charging unit that charges a surface of the image holder;

an electrostatic charge image forming unit that forms an electrostatic charge image on the charged surface of the image holder;

a developing unit that accommodates an electrostatic charge image developer containing a toner that develops an electrostatic charge image formed on the surface of the image holder as a toner image by the electrostatic charge image developer, the toner having toner particles with a release agent, wherein an amount of the release agent present in a region within 800 nm from a surface of the toner particles is 70% or more of an entire amount of the release agent in the toner particles, and a melting temperature of the release agent is 65° C. or higher and 80° C. or lower;

an intermediate transfer belt that has an outer peripheral surface to which the toner image is to be transferred;

a primary transfer unit that has a primary transfer member performing primary transfer of the toner image formed on the surface of the image holder to the outer peripheral surface of the intermediate transfer belt;

a secondary transfer unit that has a secondary transfer member performing secondary transfer of the toner image transferred to the outer peripheral surface of the intermediate transfer belt by the primary transfer to a surface of a recording medium; and a cleaning device having a cleaning blade that is brought into contact with and cleans the outer peripheral surface of the intermediate transfer belt and that has a two-layer structure consisting of an edge layer and a back surface layer, in which the edge layer and the back surface layer are constituted of a polyurethane resin, a ratio (Hb/Ha) of a hardness Hb of the edge layer to a hardness Ha of the back surface layer is 0.84 or more and 0.93 or less, and a total amount of F and Si present within 200 nm from a surface of the cleaning blade, which is brought into contact with the intermediate transfer belt of the edge layer, accounts for 75% or more of a total amount of F and Si present within 5 um from the surface.

2. The image forming apparatus according to claim 1, wherein the amount of the release agent present in the region within 800 nm from the surface of the toner particles is 75% or more of the entire amount of the release agent in the toner particles.

3. The image forming apparatus according to claim 1, wherein the melting temperature of the release agent is 70° C. or higher and 75° C. or lower.

4. The image forming apparatus according to claim 1, wherein the ratio (Hb/Ha) of the hardness Hb of the edge layer to the hardness Ha of the back surface layer of the cleaning blade is 0.87 or more and 0.90 or less.

5. The image forming apparatus according to claim 1, wherein the hardness Hb of the edge layer is 75° or more and less than 85°, and the hardness Ha of the back surface layer is 85° or more and 95° or less.

6. The image forming apparatus according to claim 5, wherein the hardness Hb of the edge layer is 77° or more and 83° or less, and
the hardness Ha of the back surface layer is 87° or more and 93° or less.

7. The image forming apparatus according to claim 1, wherein the total amount of F and Si present within 200 nm from the surface of the cleaning blade, which is brought into contact with the intermediate transfer belt of the edge layer, accounts for 85% or more of the total amount of F and Si present within 5 μm from the surface.

8. The image forming apparatus according to claim 1, wherein a total amount of F and Si present on the surface of the cleaning blade, which is brought into contact with the intermediate transfer belt of the edge layer, is 15 atm % or more.

9. The image forming apparatus according to claim 8, wherein the total amount of F and Si present on the surface of the cleaning blade, which is brought into contact with the intermediate transfer belt of the edge layer, is 18 atm % or more and 25 atm % or less.

10. The image forming apparatus according to claim 1, wherein a total amount of F and Si present at a position of 50 nm from the surface of the cleaning blade, which is brought into contact with the intermediate transfer belt of the edge layer, is 0.3 atm % or more.

11. The image forming apparatus according to claim 10, wherein the total amount of F and Si present at the position of 50 nm from the surface of the cleaning blade, which is brought into contact with the intermediate transfer belt of the edge layer, is 0.3 atm % or more and 2.0 atm % or less.

12. The image forming apparatus according to claim 1, wherein the cleaning blade contains a silicone-based polymer in a surface layer which is brought into contact with the intermediate transfer belt of the edge layer.

13. The image forming apparatus according to claim 1, wherein the cleaning blade is brought into contact with the intermediate transfer belt with a pressing force of 1.5 gf/mm or more and 3.5 gf/mm or less.

14. An image forming method comprising:
charging a surface of an image holder;
forming an electrostatic charge image on the charged surface of the image holder;
developing an electrostatic charge image formed on the surface of the image holder as a toner image by an electrostatic charge image developer containing a toner, the toner having toner particles with a release agent, wherein an amount of the release agent present in a region within 800 nm from a surface of the toner particles is 70% or more of an entire amount of the release agent in the toner particles, and a melting temperature of the release agent is 65° C. or higher and 80° C. or lower;
performing a primary transfer of the toner image formed on the surface of the image holder to an outer peripheral surface of the intermediate transfer belt;
performing a secondary transfer of the toner image transferred to the outer peripheral surface of the intermediate transfer belt by the primary transfer to a surface of a recording medium; and
bringing a cleaning blade into contact with the outer peripheral surface of the intermediate transfer belt and cleaning the outer peripheral surface of the intermediate transfer belt, the cleaning blade having a two-layer structure consisting of an edge layer and a back surface layer, in which the edge layer and the back surface layer are constituted of a polyurethane resin, a ratio (Hb/Ha) of a hardness Hb of the edge layer to a hardness Ha of the back surface layer is 0.84 or more and 0.93 or less, and a total amount of F and Si present within 200 nm from the surface which is brought into contact with the intermediate transfer belt of the edge layer accounts for 75% or more of a total amount of F and Si present within 5 um from the surface.

15. An image forming apparatus comprising:
an image holder;
charging means for charging a surface of the image holder;
an electrostatic charge image forming means that forms an electrostatic charge image on the charged surface of the image holder;
developing means for accommodating an electrostatic charge image developer containing a toner that develops an electrostatic charge image formed on the surface of the image holder as a toner image by the electrostatic charge image developer, the toner having toner particles with a release agent, wherein an amount of the release agent present in a region within 800 nm from a surface of the toner particles is 70% or more of an entire amount of the release agent in the toner particles, and a melting temperature of the release agent is 65° C. or higher and 80° C. or lower;
an intermediate transfer belt that has an outer peripheral surface to which the toner image is to be transferred;
primary transfer means for having a primary transfer member performing primary transfer of the toner image formed on the surface of the image holder to the outer peripheral surface of the intermediate transfer belt;
secondary transfer means for having a secondary transfer member performing secondary transfer of the toner image transferred to the outer peripheral surface of the intermediate transfer belt by the primary transfer to a surface of a recording medium; and
a cleaning device having a cleaning blade that is brought into contact with and cleans the outer peripheral surface of the intermediate transfer belt and that has a two-layer structure consisting of an edge layer and a back surface layer, in which the edge layer and the back surface layer are constituted of a polyurethane resin, a ratio (Hb/Ha) of a hardness Hb of the edge layer to a hardness Ha of the back surface layer is 0.84 or more and 0.93 or less, and a total amount of F and Si present within 200 nm from a surface of the cleaning blade, which is brought into contact with the intermediate transfer belt of the edge layer, accounts for 75% or more of a total amount of F and Si present within 5 μm from the surface.

* * * * *